(12) United States Patent
Wang et al.

(10) Patent No.: US 10,531,391 B2
(45) Date of Patent: Jan. 7, 2020

(54) APPARATUS, SYSTEM AND METHOD FOR POWER SAVING BETWEEN A SCHEDULING REQUEST AND GRANT USING SELF-LEARNING

(71) Applicant: APPLE INC., Cupertino, CA (US)

(72) Inventors: Beibei Wang, Cupertino, CA (US); Johnson O. Sebeni, Fremont, CA (US); Zhu Ji, San Jose, CA (US); Jia Tang, San Jose, CA (US); Xiantao Sun, Cupertino, CA (US); Yu-Lin Wang, Fremont, CA (US); Yang Li, Plano, TX (US); Wei Zhang, Santa Clara, CA (US); Tianyan Pu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 15/992,774

(22) Filed: May 30, 2018

(65) Prior Publication Data
US 2019/0373554 A1 Dec. 5, 2019

(51) Int. Cl.
*H04W 52/02* (2009.01)
*H04W 76/28* (2018.01)
*H04W 72/14* (2009.01)
*H04W 72/12* (2009.01)

(52) U.S. Cl.
CPC ... *H04W 52/0258* (2013.01); *H04W 72/1284* (2013.01); *H04W 72/14* (2013.01); *H04W 76/28* (2018.02)

(58) Field of Classification Search
None
See application file for complete search history.

(56) References Cited

U.S. PATENT DOCUMENTS

| 2014/0301373 | A1* | 10/2014 | Cili | H04W 76/048 370/336 |
| 2015/0305056 | A1* | 10/2015 | Vangala | H04W 72/1242 455/450 |

* cited by examiner

*Primary Examiner* — James P Duffy
(74) *Attorney, Agent, or Firm* — Fay Kaplun & Marcin, LLP

(57) ABSTRACT

A device and method for power saving between a scheduling request and a grant. A user equipment (UE) establishes a connection to a network, the UE and the network may be configured with a Connected Discontinuous Reception (C-DRX) functionality, the C-DRX functionality including a cycle with at least one onDuration. The UE transmits, during a first subframe a scheduling request (SR) to the network, the SR corresponds to data that is to be transmitted by the UE. The UE determines a second subframe for the UE to enter an active mode of processing for a reception of a grant, the second subframe is subsequent to the first subframe and prior to a next onDuration. The UE initiates an active mode of processing for the reception of the grant during the second subframe.

20 Claims, 10 Drawing Sheets

APPARATUS, SYSTEM AND METHOD FOR POWER SAVING BETWEEN A SCHEDULING REQUEST AND GRANT USING SELF-LEARNING

BACKGROUND

A user equipment (UE) may be configured to establish a connection with a network. For example, the UE may be a mobile device that utilizes a wireless communication protocol. During the connection with the network, the UE may execute an application in which data, such as voice data, is transmitted from the UE to the network. The transmission of the voice data may be scheduled to be successfully received by the network.

To schedule a transmission, the UE may transmit a scheduling request (SR) to the network. In response, the network may transmit an uplink grant to the UE. The uplink grant may indicate when the data is to be sent as an uplink transmission. Subsequently, the UE may send the data to the network at the time indicated by the uplink grant.

During the connection with the network, the UE may be configured with a specification or schedule that includes a set of active processing time periods and a set of available sleep time periods. For example, the UE may be configured with a connected discontinuous reception (C-DRX) cycle that includes onDurations during which the UE is configured to perform operations that enable the UE to receive data that may be transmitted to the UE. During a C-DRX cycle, when an onDuration is not scheduled, the UE has an opportunity to enter a sleep mode and conserve power.

When the UE transmits the SR outside of an onDuration, the UE may then remain active to perform operations that enable the UE to receive data (such as a response to the SR) that may be transmitted to the UE during a period of time that was originally scheduled to be an opportunity for the UE to sleep. This increases the active processing time of the UE and consequently, the amount of power consumed by the UE. For example, when a UE transmits a SR outside of an onDuration, the UE may perform operations that enable the UE to receive data to detect a grant that may be transmitted to the UE prior to the commencement of the next onDuration. However, waiting for the grant in this active state utilizes power during a period of time where the UE has an opportunity to sleep based on the C-DRX cycle. Further, this causes power to be consumed by the UE during instances where the UE is not receiving any data from the network.

SUMMARY

According to an exemplary embodiment, a method may be performed by a user equipment (UE). The UE may be associated with an evolved Node B (eNB) to establish connection to a Long Term Evolution (LTE) network, the UE and the LTE network may be configured with a Connected Discontinuous Reception (C-DRX) functionality, the C-DRX functionality including a cycle with at least one onDuration. The method includes transmitting, during a first subframe a scheduling request (SR) to the LTE network, wherein the SR corresponds to data that is to be transmitted by the UE. The method further includes, determining a second subframe for the UE to enter an active mode of processing for a reception of a grant, wherein the second subframe is subsequent to the first subframe and prior to a next onDuration. The method further includes, initiating the active mode of processing for the reception of the grant during the second subframe.

According to another exemplary embodiment, a user equipment (UE) includes a transceiver configured to establish connection with an evolved Node B (eNB) corresponding to a Long Term Evolution (LTE) network, the UE and the LTE network configured with a Connected Discontinuous Reception (C-DRX) functionality, the C-DRX functionality including a cycle with at least one onDuration. The UE further includes a processor configured to instruct the transceiver to operate in a first mode where the transceiver is in an active mode for all the subframes between a first subframe when a scheduling request (SR) is transmitted by the transceiver and a second subframe corresponding to a start of the onDuration. The processor is further configured to instruct the transceiver to operate in a second mode when the transceiver is in a sleep mode for at least one subframe between the first subframe and the second subframe.

According to a further exemplary embodiment, an integrated circuit has circuitry configured to establish a connection to a Long Term Evolution (LTE) network, the first circuitry and the LTE network configured with a Connected Discontinuous Reception (C-DRX) functionality, the C-DRX functionality including a cycle with at least one onDuration. The integrated circuit further includes, circuitry configured to generate for transmission, during a first subframe, a scheduling request (SR) to the LTE network, wherein the SR corresponds to data that is to be transmitted to the LTE network. The integrated circuit further includes, circuitry configured to determine a second subframe, during which an active mode of processing for a reception of a grant is initiated, wherein the second subframe is subsequent to the first subframe and prior to a next onDuration. The integrated circuit further includes, circuitry configured to initiate the active mode of processing for the reception of the grant during the second subframe.

DETAILED DESCRIPTION

Figure 1:
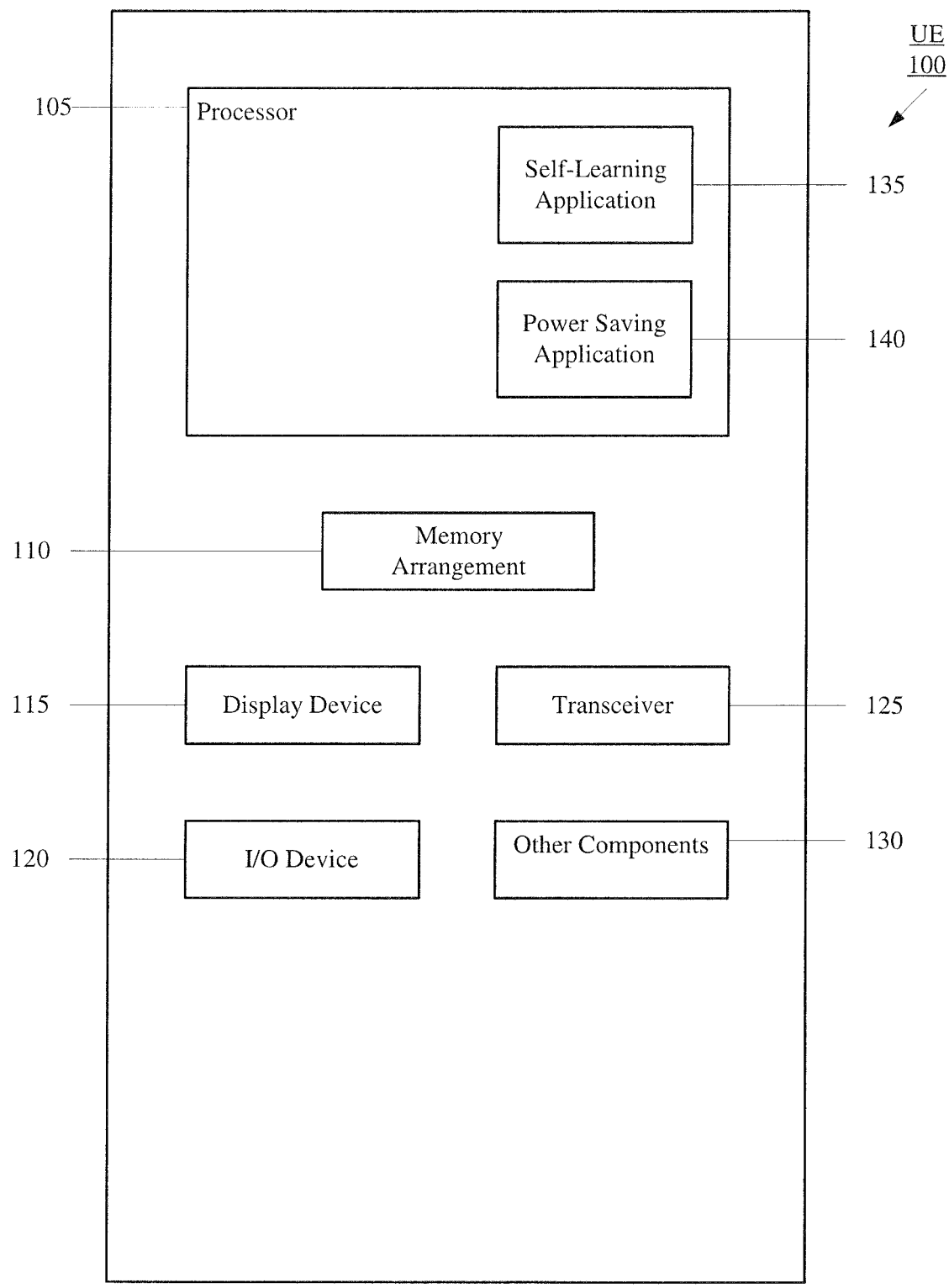
FIG. 1 shows a user equipment according to various exemplary embodiments.

The exemplary embodiments may be further understood with reference to the following description and the related appended drawings, wherein like elements are provided with the same reference numerals. The exemplary embodiments are related to an apparatus, system and method for power saving between the transmission of a scheduling request (SR) and the reception of a grant. Specifically, the exemplary embodiments may address the above noted deficiencies concerning power consumption during a period of time where the UE has an opportunity to sleep, by limiting the performance of operations that enable the UE to receive control channel information (e.g., an uplink grant, a downlink grant) to instances where control channel information is likely to be received.

Initially, it is noted that the exemplary embodiments are described with regard to a UE. However, the use of a UE is merely for illustrative purposes. The exemplary embodiments may be utilized with any electronic component that may establish a connection with a network and configured with the hardware, software, and/or firmware to perform certain operations such as the transmission of requests and the reception of control information. Therefore, the UE as described herein is used to represent any electronic component.

Further, it is noted that the exemplary embodiments are described with regard to the network being a LTE network and the base station of the network being an evolved Node B (eNB). However, it should be noted that the use of the LTE network and the eNB is merely for illustrative purposes. Those skilled in the art will understand that the network may be any network that may schedule resources allocated to the UE. The base station may be any type of base station within the corresponding network.

The UE may establish a connection to the LTE network via an eNB. To properly be prepared for demodulating signals (i.e., received signals by the UE), the UE is configured with proper settings. Specifically, properties related to the physical layer of the transceiver used to connect to the network are known. For example, the channel (e.g., band of frequencies) is known for the incoming signal for it to be properly received. Therefore, control channel information such as physical downlink control channel (PDCCH) information, reference symbols, etc. may be received in a background operation during connection with the LTE network. Furthermore, to transmit signals to the network, the LTE network provides the UE with a schedule to perform the data transmission via an uplink grant.

A UE connected to the LTE network may utilize a predetermined manner of receiving the control channel information. For example, a discontinuous reception (DRX) functionality, such as a cycle associated with a connected DRX (C-DRX) functionality may be used. The C-DRX cycle relates to utilizing an active mode of data exchange processing and a sleep mode of inactivity to conserve power. The C-DRX may include a specification or schedule in which the control channel information is received. Therefore, the UE may use the active mode of processing at defined intervals to perform scheduled operations such as transmitting requests and receiving control channel information. The time period at which the control channel information may be received may be termed the onDuration for the C-DRX cycle. The onDuration relates to a duration over which the UE may perform operations that enable the UE to receive data that may be transmitted to the UE such as but not limited to, control channel information, uplink grant, downlink grant, payload data etc. For instance, during the onDuration the UE may tune its transceiver to the downlink control channel to detect transmissions from the network. During the C-DRX cycle, when an onDuration is not scheduled the UE may have an opportunity to utilize the sleep mode of inactivity based on the C-DRX cycle.

The C-DRX cycle may have a predetermined duration N such as 40 milliseconds (ms), 20 ms, etc. For example, at a time 0, there may be an onDuration during which the active mode of processing is used. Subsequently, upon the conclusion of the onDuration, the UE has an opportunity to utilize the sleep mode of inactivity. Then at a time N, there may be another onDuration. Subsequently, the sleep mode is used until a time 2N. This process continues for the duration of the C-DRX cycle. It should be noted that the sleep mode does not necessarily mean putting the processor, the transmitter, and the receiver of the UE to sleep, in hibernation, or in deactivation. For example, the processor may continue to execute other applications or processes. The sleep mode relates to conserving power by discontinuing a continuous processing functionality relating to operations that enable the UE to receive data that may be transmitted to the UE and transmit data to the network. It should be noted that a C-DRX cycle being configured in ms units is merely for illustrative purposes, the exemplary embodiments may utilize a DRX cycle that is based on subframes or any other suitable unit of time.

It is noted that the exemplary embodiments are described herein with regard to the LTE network in which C-DRX functionality may be configured. However, those skilled in the art will understand that the functionalities described herein may be applied to other network arrangements and configurations. For example, other networks such as 5G networks may utilize a discontinuous reception cycle similar to C-DRX. Thus, the functionalities described herein may also be implemented for UEs that connect to 5G networks.

During the connection to the LTE network, the UE may execute applications that perform operations including the transmission of data to the network. The transmission of data related to the application may be scheduled with the network. To schedule a transmission, the UE may transmit a SR prior to the transmission of the data related to the application. The SR may indicate that the UE is requesting that the transmission of data related to the application (e.g., voice data received from the user in a Voice-over-LTE (VoLTE) call) be scheduled with the network. Upon receiving the SR, the eNB may generate control channel information that is to be transmitted to the UE. The control channel information may include an indication of whether the UE is allocated a grant to transmit the data related to the application (e.g., an uplink grant). The uplink grant may indicate when the voice data is to be transmitted as an uplink transmission. However, it should be noted that the use of a SR and a grant related to an uplink transmission is merely exemplary. The exemplary embodiments may also apply to a SR and a grant related to the reception of data over the downlink. For example, as described above, once the UE transmits an SR outside of the onDuration, the UE may remain in an active processing mode. The eNB may understand that the UE will be in the active processing mode and that, in addition to sending the uplink grant, other control channel information, such as a downlink grant may be sent to the UE because the UE is active. Thus, the downlink grant may be unrelated to the SR, but the eNB may opportunistically send the downlink grant over the control channel because the eNB is aware the UE is in an active processing mode based on the SR being sent outside of the onDuration.

A person of ordinary skill in the art will understand that an active mode of processing for the reception of data and/or control channel information transmitted to the UE may include operations such as the UE powering on its receiver and tuning the receiver to select channels to listen for transmissions to the UE. It will be further understood, that reference to a sleep, a sleep mode of processing, etc. may include operations such as the UE powering down its receiver and not listening for transmissions to the UE. The active mode of processing and the sleep mode of processing may also include other operations and the turning on/off the receiver should be understood to only be exemplary of operations that may be performed in these modes.

Throughout this description, the control channel information that is transmitted to the UE via the control channel may be generally referred to as control channel information or may also refer to the specific type of information that is transmitted, e.g., an uplink grant, a downlink grant, etc. The information that is transmitted to the UE via the data channel may be referred to generally as data or the specific type of payload data (e.g. voice data). In addition, when referring generally to any downlink information (control or data channel), the term data may also be used.

Conventionally, when a UE transmits a SR outside of an onDuration, the UE may remain active to perform operations that enable the UE to receive data that may be transmitted to the UE (e.g. an uplink grant, a downlink grant) prior to the next onDuration. At the commencement of the next onDuration, the UE may operate in accordance with the C-DRX schedule. The duration between the transmission of a SR and the reception of a grant will vary from connection to connection. This variation may be based on factors such as, but not limited to, the type of UE, the type of base station, the carrier, the current traffic of the wireless network, the use of Frequency-division duplexing (FDD), the use of time division duplexing (TDD), etc. However, remaining active to wait for a grant in this conventional manner causes power to be consumed by the UE during instances where the UE is not receiving any control channel information from the network.

The exemplary embodiments may be configured with self-learning that may predict when the UE is likely to receive a grant. Further, the exemplary embodiments may employ a scheduling request (SR) power saving mode based on when the UE determines it is likely to receive a grant. For instance, in a SR power saving mode of operation, when the UE transmits a SR outside of an onDuration, the UE may determine when the network is likely to transmit control channel information (e.g. uplink grant, downlink grant) to the UE and the UE may limit its active mode of processing to instances where the UE determined it is likely to receive control channel information from the network. Thus, the SR power saving of the exemplary embodiments may eliminate instances where the UE is in an active mode of processing but not receiving any control channel information from the network.

FIG. 1 shows a user equipment according to various exemplary embodiments. The UE 100 may be configured with a self-learning functionality that may predict when control channel information is likely to be transmitted to the UE 100 and a SR power saving mode of operation that may limit the active mode of processing for the reception of control channel information from the network to instances where the UE determines control channel information may be received. During operation, the UE 100 may exchange data with a base station of a wireless network, receive data therefrom, and transmit requests thereto. The UE 100 may represent any electronic device that is configured to perform wireless functionalities. For example, the UE 100 may be a portable device such as a phone, a smartphone, a tablet, a phablet, a laptop, a wearable, an Internet of Things (IoT) device, etc. In another example, the UE 100 may be a stationary device such as a desktop terminal. The UE 100 may include a processor 105, a memory arrangement 110, a display device 115, an input/output (I/O) device 120, a transceiver 125, and other components 130. The other components 130 may include, for example, an audio input device, an audio output device, a battery, a data acquisition device, ports to electrically connect the UE 100 to other electronic devices, etc.

The processor 105 may be configured to execute a plurality of applications. For example, the applications may include a VoLTE application such that a talk spurt from a user of the UE 100 is converted into a voice transmission. The processor 105 may also execute a self-learning application 135 that may be configured to predict when the UE 100 is likely to receive a grant after the transmission of a SR outside of an onDuration. Further, the processor 105 may execute a scheduling request (SR) power saving application 140 that may be configured to limit the active processing performed by UE 100 with respect to the reception of control channel information, to instances where the UE 100 determines that the reception of control channel information is likely to occur. The self-learning application 135 and the SR power saving mode application 140 may be executed in the background relative to the user and may be automatically executed upon a connection with the network, particularly when the VoLTE application is executed.

It should be noted that the above noted applications being an application (e.g., program) executed by the processor 105 is only exemplary. The applications may also be represented as components of one or more multifunctional programs, a separate incorporated component of the UE 100 or may be a modular component coupled to the UE 100, e.g., an integrated circuit with or without firmware. In addition, in some UEs there are multiple processors, e.g., a baseband processor and an application processor. The functionality described with regard to the application processor 105 may be performed by a baseband processor or a single processor that performs the functionality of the application processor 105 and a baseband processor. The exemplary embodiments may be implemented in any of these or other configurations of a UE. The functionality provided by the self-learning application 135 and the SR power saving application 140 may be performed by a single application or by a plurality of applications. Further, it should be noted that the self-learning application 135 and the SR power saving application 140 do not need to be executed by the processor 105. The functionality that is described herein for the self-learning application 135 and the SR power saving mode application 140 may be performed by the transceiver 125 executing firmware stored on an integrated circuit of the transceiver 125.

The memory arrangement 110 may be a hardware component configured to store data for the UE 100. Specifically, the memory arrangement 110 may store data such as, but not limited to, voice transmissions, control channel information, a schedule related to a C-DRX cycle, data that provides a basis for predicting when the UE 100 is likely to receive data, etc. The display device 115 may be a hardware component configured to show data to a user while the I/O device 120 may be a hardware component that enables the user to enter inputs. It should be noted that the display device 115 and the I/O device 120 may be separate components or integrated together such as a touchscreen.

The transceiver 125 may be a hardware component configured to transmit and/or receive data. The transceiver 125 may enable communication with other electronic devices directly or indirectly through a network based upon an operating frequency of the network. The transceiver 125 may operate on a variety of different frequencies or channels (e.g., set of consecutive frequencies). Thus, an antenna (not shown) coupled with the transceiver 125 may enable the transceiver 125 to operate on the various frequencies. The transceiver 125 may be used to receive data from the base station (e.g., eNB) and transmit data to the base station. In a first example, control channel information may be received from the eNB via the transceiver 105 during an onDuration as indicated by the C-DRX cycle. In a second example, a SR may be transmitted to the eNB via the transceiver 105 outside of an onDuration. In a third example, an uplink grant may be received from the eNB via the transceiver 105 outside of an onDuration. In a further example, a voice transmission may be transmitted to a server of the LTE network through a corresponding eNB at the allocated time indicated by the uplink grant. It should be noted these examples and configurations are merely provided for illustrative purposes and the transceiver 125 of the UE 100 may exchange data with the network in any appropriate manner.

Figure 2:
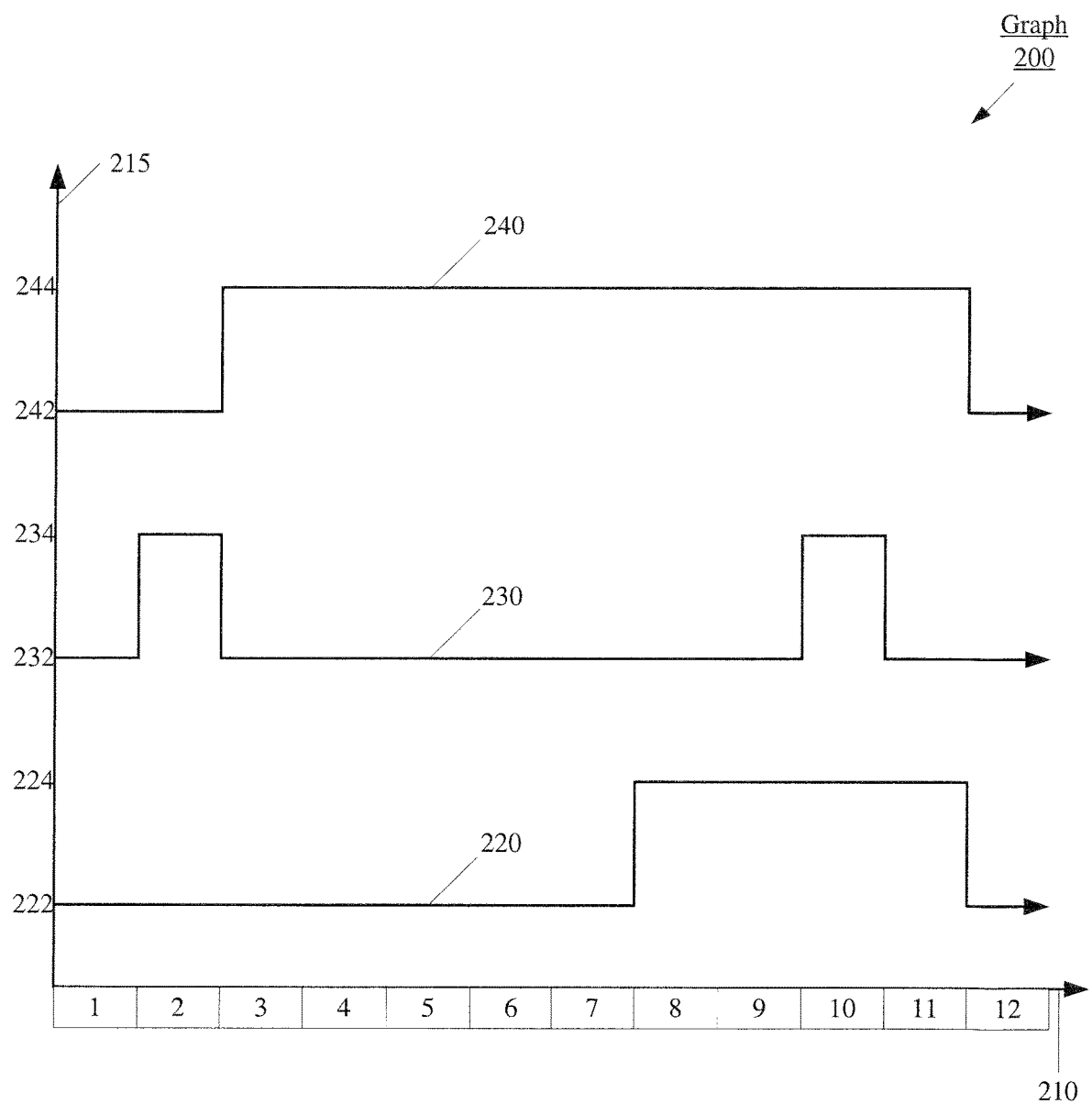
FIG. 2 shows a graph that provides an example of when an active mode of processing occurs during the SR legacy mode of operation according to various exemplary embodiments.

FIG. 2 shows a graph that provides an example of when an active mode of processing occurs during the SR legacy mode of operation according to various exemplary embodiments. The graph 200 illustrates when the UE 100 may be in an active mode of processing during a SR legacy mode of operation. The x-axis 210 represents time. Each interval (1-12) along the x-axis 210 represents a subframe in milliseconds (ms) and for illustrative purposes will be referred to as subframe 1, subframe 2, subframe 3, etc.

The graph 200 includes three line graphs 220, 230 and 240 representing different operations performed by the UE 100. Line graph 220 represents a portion of a C-DRX cycle and the level of the line graph 220 on the y-axis 215 illustrates when the receiver of the UE 110 may be in an active mode of processing and when the receiver of the UE 110 may be in a sleep mode of processing in accordance with an onDuration of the C-DRX cycle. For example, when the line graph 220 is plotted along the x-axis 210 at point 222 of the y-axis 215, an onDuration is not occurring and the UE 100 has an opportunity to enter a sleep mode of inactivity. When the line graph 220 is plotted along the x-axis 210 at point 224 of the y-axis 215, an onDuration is occurring and the UE 100 may enter an active mode of processing by tuning its transceiver 125 to detect transmissions from the network. Here, the onDuration begins at subframe 8 and ends with subframe 11. However, a 4 ms onDuration is merely exemplary and the UE 100 may be configured with a DRX cycle that includes an onDuration of any suitable length.

Line graph 230 relates to uplink transmissions performed by the UE 100 and the level of the line graph 230 on the y-axis 215 illustrates when the UE 100 is in an active mode of processing transmissions. For example, when the line graph 230 is plotted along the x-axis 210 at point 232 of the y-axis 215 the UE 100 is not in an active mode of processing a transmission. When the line graph 230 is plotted along the x-axis 210 at point 234 of the y-axis 215 the UE 100 is in an active mode of processing a transmission. Thus, the line graph 230 illustrates that during subframe 2 and subframe 10 the UE 100 may be performing a transmission.

Consider that the transmission performed during subframe 2 is a SR. Further, consider that the transmission performed during subframe 10 is an uplink transmission performed over the physical uplink shared channel (PUSCH) based on an uplink grant received in response to the SR transmitted during subframe 2. The use of the PUSCH is merely for illustrative purposes and the UE 100 may utilize any uplink channel or combination of uplink channels to transmit data to the network. Therefore, as demonstrated by the line graph 230, the UE 100 may be in an active mode of processing during subframe 2 when the UE 100 is transmitting the SR and during subframe 10 when the UE 100 is transmitting data over the PUSCH. It should be noted that the configuration of transmissions performed by the UE 100 in the graph 200 is merely for illustrative purposes and the UE 100 may perform transmissions in any suitable configuration. It should be further noted that a transmission over a single subframe is merely provided for exemplary for purposes, the UE 100 may perform a transmission over any number of subframes or alternatively, over a portion of a single subframe.

Line graph 240 relates to the UE 100 performing operations that enable the UE to receive data from the network (e.g., tune the transceiver 125 to listen for transmissions). The level of the line graph 240 on the y-axis 215 illustrates when the UE 100 is in an active mode of processing for the reception of transmissions from the network. For example, when the line graph 240 is plotted along the x-axis 210 at point 242 of the y-axis 215 the UE 100 is not in an active mode of processing for the reception of transmissions from the network. When the line graph 240 is plotted along the x-axis 210 at point 244 of the y-axis 215 the UE 100 is in an active mode of processing for the reception of data transmitted by the network.

During subframe 1, the UE 100 is not in an active mode of processing for the reception of data transmitted by the network. Instead, the UE 100 may be conserving power by taking advantage of the opportunity to sleep provided by the C-DRX cycle illustrated by line graph 220. In subframe 3, the UE 100 may enter an active mode of processing for the reception of data transmitted by the network (e.g., tuning the transceiver 125 to listen for transmissions). The UE 110 may enter the active mode of processing to ensure the reception of an uplink grant that may be transmitted by the network in response to the SR transmission that was shown in subframe 2 that was outside of the onDuration of the C-DRX cycle. For exemplary purposes, consider that an uplink grant may be received in response to the SR during subframe 6. However, it should be noted that reception of an uplink grant during subframe 6 is merely for exemplary purposes, the UE 100 may receive the uplink grant at any instance outside of the onDuration or during the onDuration. It should be further noted that the reception of a grant may occur over a plurality of subframes, over a single subframe or over a portion of a single subframe and the amount of time it takes to receive a grant in response to a SR may vary from connection to connection. Thus, in the example provided in the graph 200, the line graph 240 illustrates that in a SR legacy mode of operation the UE 100 may be in an active mode of processing for the reception of data starting at subframe 3 and ending with the onDuration at subframe 11.

The exemplary embodiments may provide a SR power saving mode of operation that may be utilized instead of the SR legacy mode of operation. As mentioned above, the SR power saving mode of operation may be configured to eliminate instances where the UE 100 is in an active mode of processing and not receiving any control channel information from the network. The SR power saving mode of operation may include determining when the UE 100 is likely to receive control channel information (e.g. an uplink grant, a downlink grant) from the network. However, depending on various factors, the exchange of data between the UE 100 and the network may vary from connection to connection. Accordingly, in certain exemplary embodiments the SR power saving mode of operation may be based on data determined using self-learning related to predicting when control channel information may be received by the UE 100 after the UE 100 has transmitted a SR to the network.

Figure 3:
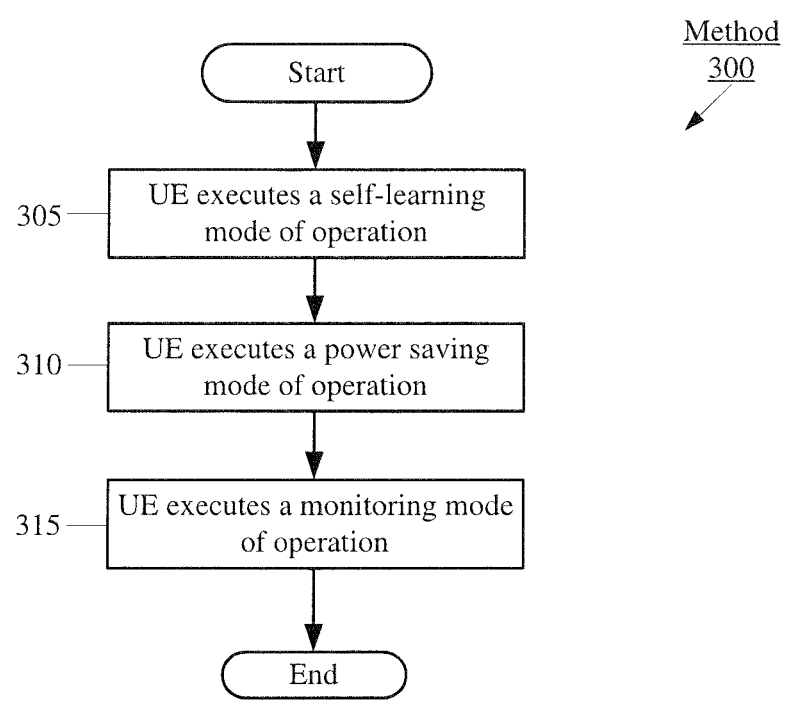
FIG. 3 shows a method 300 for the UE to limit the active processing time of the UE after the transmission of a SR according to various exemplary embodiments.

FIG. 3 show a method 300 for the UE 100 to limit the active processing time of the UE 100 after the transmission of a SR according to various exemplary embodiments. The method 300 will be described with reference to the UE 100.

In 305, the UE 100 executes a self-learning mode of operation that may enable the UE 100 to predict when the UE 100 is likely to receive control channel information after the transmission of a SR that is outside the onDuration. The self-learning mode of operation may include collecting statistics related to the transmission of a SR. The statistics may indicate when the UE 100 received control information after the transmission of a SR. The UE 100 may remain in the self-learning mode of operation until a predetermined number of statistics have been collected. The statistics may provide the basis for the UE 100 to determine when the UE 100 is likely to receive control channel information from the network after the transmission of a SR. The self-learning mode of operation will be described in further detail below with regard to the method 400.

In 310, the UE 100 may enter an SR power saving mode of operation that may enable the UE 100 to limit its active processing time after the transmission of a SR and outside of an onDuration, to instances where the UE 100 is likely to receive control channel information from the network. This eliminates instances where the UE 100 is in an active mode of processing for the reception of control channel information, but the reception of control channel information is unlikely. The SR power saving mode of operation will be described in further detail below with regard to the method 500.

In 315, the UE 100 may enter a monitoring mode of operation that enables the UE 100 to determine whether to remain in the SR power saving mode of operation or exit the SR power saving mode of operation. This may include monitoring the downlink channel and the uplink channel to determine whether a predetermined condition has been satisfied. If the predetermined condition has not been satisfied, the UE 100 may remain in the SR power saving mode of operations. If the predetermined condition has been satisfied, this may indicate to the UE 100 that the parameter the UE 100 is utilizing to determine when the UE 100 is likely to receive control channel information does not accurately reflect the current scheduling behavior of the connection between the UE 100 and the network. This indication may trigger the UE 100 to exit the SR power saving mode of operation and return to the self-learning mode of operation. The monitoring mode of operation will be described in detail below with regard to the method 700.

Figure 4:
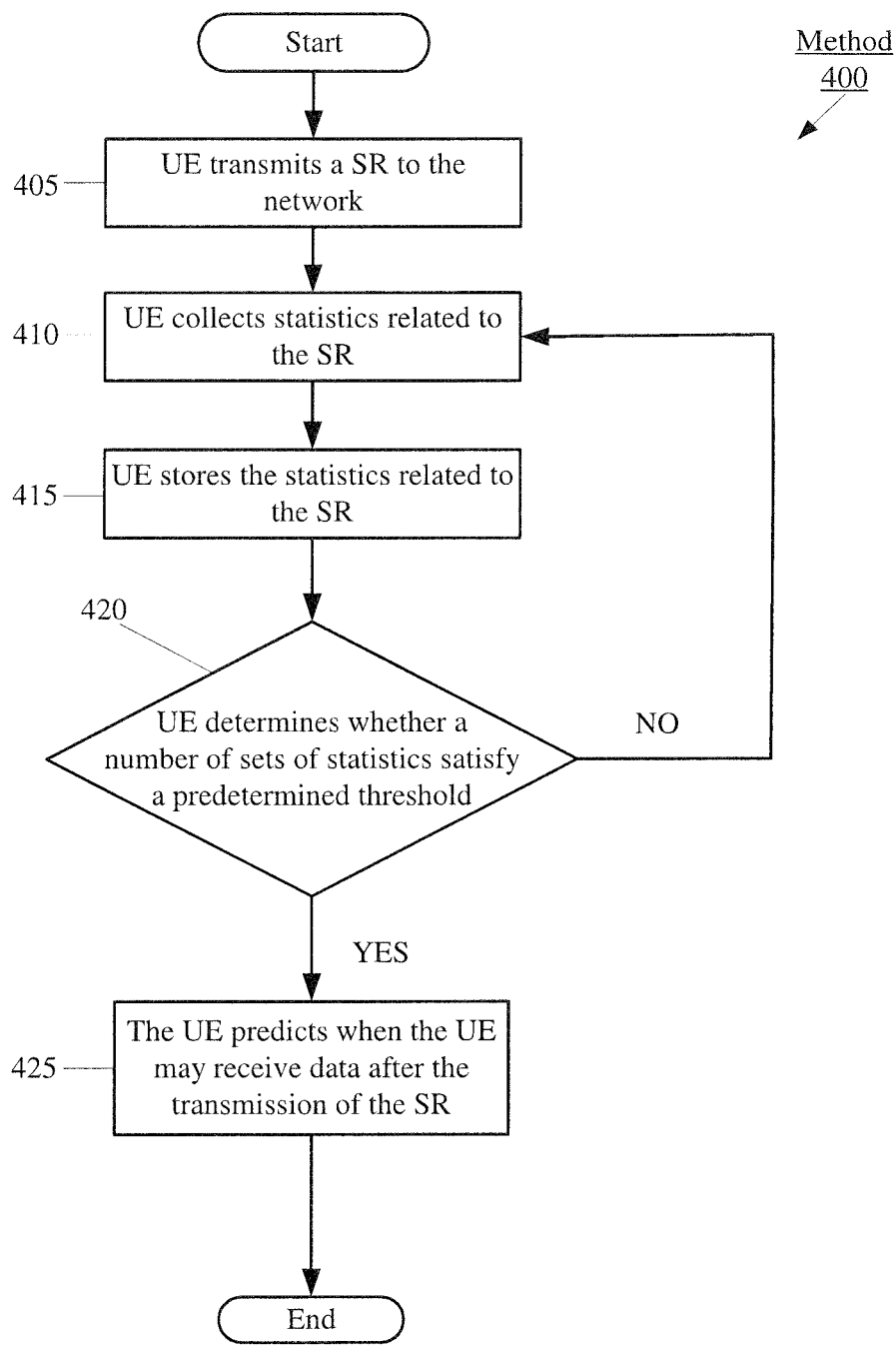
FIG. 4 shows a method for the self-learning mode of operation according to various exemplary embodiments.

FIG. 4 shows a method 400 for the self-learning mode of operation according to various exemplary embodiments. The method 400 relates to the self-learning mode of operation shown in 305 of the method 300. Self-learning may relate to predicting when a grant is likely to be received by the UE 100 after the UE 100 has transmitted a SR to the network. It may be considered that the UE 100 may be currently connected to an eNB and configured with a C-DRX cycle. Further, it may be considered that the UE 100 may be executing the self-learning application 135. Thus, the method 400 may relate to a UE 100 that has performed a connection setup with the network, been configured with a C-DRX cycle and initiated the execution of its self-learning application 135. However, reference to connection setup, a C-DRX cycle and the self-learning application is merely for illustrative purposes, different networks may refer to similar operations in a different manner. The method 400 will be described with reference to the UE 100, the graph 200 and the method 300.

In 405, the UE 100 transmits a SR to the network. For instance, during the execution of a VoLTE application, the UE 100 may have voice data that is to be transmitted to the network. However, prior to the transmission of the VoLTE data the UE 100 may transmit a SR to an eNB of the network. The SR indicates to the network that the UE 100 has data to be scheduled for an uplink transmission over an uplink channel, such as the PUSCH. It should be noted that reference to a VoLTE application and corresponding data is merely provided for illustrative purposes and a SR may be sent in relation to any data that the UE 100 has for the uplink. Further, it should be noted that the SR corresponding to an uplink grant and the uplink channel corresponding to the PUSCH is only exemplary. The exemplary embodiments may apply to a grant that corresponds to any uplink channel. Further, the exemplary embodiments may also apply to the transmission of a SR and a downlink grant that occurs after the SR and the use of any type of corresponding downlink channel.

In 410, the UE 100 collects statistics corresponding to the SR. The statistics may include, but are not limited to, an indication as to the amount of time from the transmission of the SR to the reception of a downlink grant (sr2DLGrant) and an indication as to the amount of time from the transmission of the SR to the reception of an uplink grant (sr2ULGrant). The statistics may be collected based on a timer, by determining a number of subframes between a SR and a grant, or by any other suitable manner. It should be noted that sr2DLGrant and sr2ULGrant are merely provided for exemplary purposes and the UE 100 may collect any statistic related to predicting the amount of time between a SR and a grant. Also, as described above, the uplink grant is typically in response to the SR, while the downlink grant is an opportunistic grant based on the SR but not in response to the SR.

Further, it should be noted that the UE 100 may collect statistics corresponding to the SR transmitted in 305 based on whether the transmission of the SR was preceded by a period of sleep for the UE 100. For instance, in a conventional network arrangement, depending on various factors, if the UE 100 is in a sleep mode before the transmission of a SR, the network may transmit a grant in response to the SR outside of an onDuration. The UE 100 may utilize this conventional network arrangement trait to trigger the collection of the statistics corresponding to the SR. This may allow the UE 100 to perform the functionality related to the collection of statistics corresponding to the SR during instances where control information may be transmitted to the UE 100 outside of an onDuration. However, it should be noted that the UE 100 may trigger the collection of statistics based on any suitable indicator. Alternatively, the UE 100 may collect statistics corresponding to every SR.

In 415, the UE 100 stores the statistics corresponding to the SR. The UE 100 may store each set of statistics with an indication of the corresponding connection, an indication as to when the statistics were collected or any other suitable indication that may allow the UE 100 to identify what each set of statistics corresponds to, so the statistics may be utilized to provide a basis for predicting when the UE 100 is likely to receive a grant after the transmission of a SR. However, it should be noted that reference to a set of statistics is merely provided for exemplary purposes, the exemplary embodiments may store the statistics in any suitable format. For instance, the UE 100 may store the sr2DLGrant data and sr2ULGrant data separately.

In 420, the UE 100 determines whether a number of sets of statistics satisfy a predetermined threshold. The sets of statistics may be used as a basis to predict when the UE 100 is likely to receive a grant after the transmission of a SR. The UE 100 may track the number of sets of statistics by utilizing a counter, querying a database or in any other suitable manner that enables the UE 100 to determine how many sets of statistics have been collected for a particular connection. For example, the predetermined threshold may be 20 sets of statistics for the current connection. However, the use of 20 sets of statistics as the predetermined threshold is merely exemplary, as any number of sets of statistics suitable to be utilized for the prediction of when a UE 100 is likely to receive control channel information after the transmission of a SR may be used. If the threshold has been satisfied, the method 400 continues to 425 where further processing occurs. If the predetermined threshold is not satisfied, the method 400 returns to 410 where the UE 100 collects statistics related to a subsequent SR.

In 425, the UE 100 predicts when the UE 100 is likely to receive a grant after the transmission of a SR. For instance, the UE 100 may execute a power saving probability function based on the stored data. The power saving probability function may produce a number (x) that provides an indication as to when the UE 100 predicts a grant is likely to be received. This prediction may enable the UE 100 to decrease the amount of active processing because the UE 100 has determined when the UE 100 is likely to receive a grant. Thus, after the transmission of a SR, the UE 100 may enter a sleep mode as provided by the C-DRX cycle when the UE 100 determines that the UE 100 is unlikely to receive control channel information (e.g. an uplink grant, a downlink grant, etc.) and the UE 100 may limit its active mode of processing for the reception of control information from the network when the UE 100 predicts that the UE 100 is likely to receive a grant.

The power saving probability function may be based on the statistics collected in 410. As mentioned above, the statistics may include a plurality of sets of statistics related to a particular connection between the UE 100 and the network. Each set may include, an indication as to the amount of time from the transmission of the SR to the reception of a downlink grant (sr2DLGrant) and an indication as to the amount of time from the transmission of the SR to the reception of an uplink grant (sr2ULGrant). The function may compare the minimum sr2DLGrant and the minimum sr2DLGrant from the sets of statistics to different integers (x) and determine the largest (x) that provides a probability that satisfies a predetermined threshold (Thr1). The predetermined threshold (Thr1) may be set to 95% as a default value. However, the use of 95% as Thr1 is merely for illustrative purposes and any value may be utilized. An example of the power saving probability function may be as follows:

$$\text{Prob}(\min\{sr2DLGrant, sr2ULGrant\} \geq x) \geq Thr1$$

It should be noted that reference to sr2DLGrant and sr2ULGrant is merely exemplary. Self-learning may generate a predication related to when the UE 100 is likely to receive control channel information (e.g. uplink grant, downlink grant) after the transmission of a SR based on any indication that corresponds to when the current connection or a similar connection provided control channel information based on a SR.

Subsequently, the exemplary embodiments may utilize the prediction generated in the method 400 to perform functions related to the SR power saving mode. It is noted that the SR power saving mode of operation does not require self-learning to be performed. That is, the UE 100 may receive or determine other indications that may provide the basis for a power saving mode. For example, when the connection between the UE 100 and the network is utilizing FDD, the UE 100 may forgo self-learning because typically during FDD if a SR is transmitted at subframe N, then an uplink grant may be received at subframe N+4 and thus, the UE 100 may utilize this information to determine (x) instead of utilizing the power saving probability function to determine (x). Alternatively, when the connection between the UE 100 and the network is utilizing TDD, the UE 100 may forgo self-learning because according the $3^{rd}$ Generation Partnership Project (3GPP) Technical Specification (TS) 36.213 uplink grant occasions have to follow the parameter $K_{PUSCH}$ as defined in table 5.1.1.1-1 and thus, the UE 100 may utilize this information to determine (x) instead of utilizing the power saving probability function to determine (x). Further, if fast scheduling is employed, the UE 100 may utilize characteristics of fast scheduling to determine (x). Thus, the exemplary embodiments do not require the performance of self-learning and instead, other factors may be used to predict when the UE 100 is likely to receive control channel information after the transmission of a SR.

Figure 5:
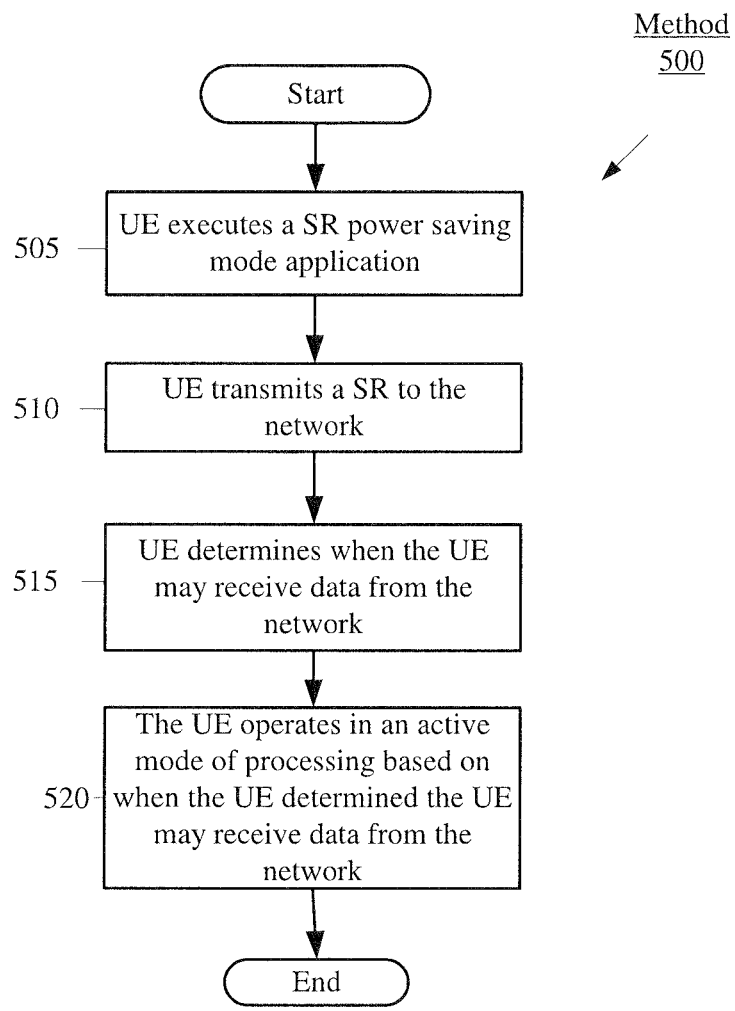
FIG. 5 shows a method for the SR power saving mode of operation according to various exemplary embodiments

FIG. 5 shows a method 500 for the SR power saving mode of operation according to various exemplary embodiments. The method 500 relates to the SR power saving mode of operation in 310 of the method 300. The SR power saving mode of operation may relate to when the UE 100 transmits a SR outside of an onDuration of a C-DRX cycle. Specifically, the UE may enter the SR power saving mode of operation and based on a prediction as to when the UE 100 is likely to receive control channel information after the transmission of a SR, the UE 100 may limit its active mode of processing. The method 500 will be described with reference to the UE 100, the method 300 and the method 400. However, as mentioned above, the results of self-learning providing the basis for determining when the UE 100 is likely to receive control channel information is merely exemplary and the UE 100 may utilize other factors to determine when the UE 100 is likely to receive data.

In 505, the UE 100 executes the SR power saving mode application 140. It may be considered that the UE 100 may be currently connected to an eNB and configured with a C-DRX cycle. The execution of the SR power saving mode application 140 may be triggered by a conditional event. For example, upon the completion of self-learning corresponding to the particular connection between the UE 100 and the network, the UE 100 may trigger the execution of the SR power saving mode application 140. Alternatively, the SR power saving application 140 may be executed based on events such as, but not limited to, user input, a parameter satisfying a predetermined threshold, a timer, a counter, measurements of network conditions, or a any combination thereof.

In 510, the UE 100 transmits a SR to the network. For example, the UE 100 may transmit a SR to the network when the UE 100 has data corresponding to an application that is to be scheduled for transmission on an uplink channel. It may be considered that the SR is transmitted before an onDuration of the UE 100.

In 515, the UE 100 determines when the UE 100 is likely to receive control channel information from the network (e.g. an uplink grant, a downlink grant, etc.). This determination may be based on the operation of the self-learning application 135. Thus, self-learning may provide the UE 100 with a parameter that provides the basis for determining when the UE 100 is likely to receive control channel information from the network and may also serve as an event that triggers the initiation of the execution of the SR power saving mode. For example, as demonstrated in method 400 the self-learning application 135 may determine a value for (x) that provides a prediction as to when the UE 100 may enter an active mode of processing to detect a transmission from network (e.g., tune the receiver of the transceiver 125 to listen for transmissions). Upon the completion of the method 400, the UE 100 may initiate SR power saving mode of operation. Subsequently, the prediction generated as a result of the method 400 may provide the basis for when, after the transmission of a SR, the UE 100 may tune its receiver to detect a transmission from the network. However, as mentioned above, utilizing the results of self-learning is merely exemplary and the UE 100 may determine when the UE 100 may enter an active mode of processing to detect a transmission from network in any appropriate manner.

It should be noted that an onDuration may overlap with when the UE 100 determined control channel information is likely to be transmitted to the UE 100. Thus, the UE 100 may determine whether the C-DRX cycle includes an onDuration during when the UE 100 determined control channel information may be received from the network in 515. If the UE 100 determines that an onDuration includes when the UE 100 determined that control channel information is likely to be received from the network in 515, the UE 100 may operate in accordance with the C-DRX cycle because the UE 100 will already be in an active mode of processing when the control channel information is transmitted to the UE 100.

In 520, the UE 100 may operate in an active mode of processing based on when the UE 100 determined that the UE 100 is likely to receive control channel information from the network. Further, the UE 100 may operate in a sleep mode of inactivity during instances where the UE 100 determined that the UE 100 is likely not to receive any control channel information. Thus, the SR power saving mode of operation results in power saving by the UE 100 over the SR legacy mode of operation because in the SR power saving mode of operation the UE 100 is limiting its active mode of processing to instances where the UE 100 has determined that it is likely to receive control channel information from the network. This eliminates instances that occur during the SR legacy mode of operation where the UE 100 has an opportunity to sleep based on the C-DRX cycle but instead, the UE 100 is using power to perform operations that enable the UE 100 to receive control channel information from the network and not receiving any control channel information.

Figure 6:
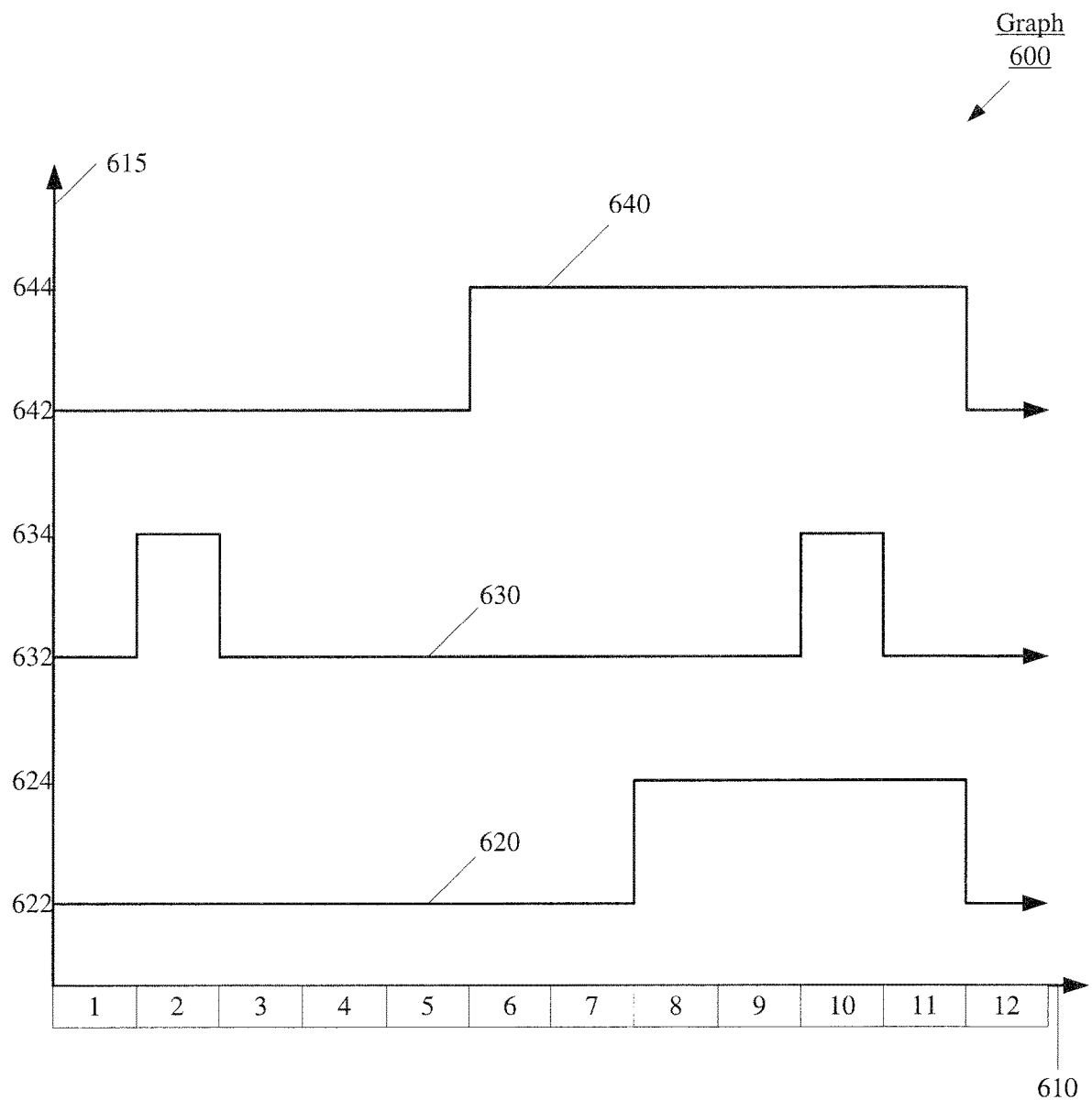
FIG. 6 shows a graph that provides an example of when an active mode of processing occurs during the SR power saving mode of operation according to various exemplary embodiments.

FIG. 6 shows a graph that provides an example of when an active mode of processing occurs during the SR power saving mode of operation according to various exemplary embodiments. The graph 600 illustrates when the UE 100 may be in an active mode of processing during a SR power saving mode of operation. Further, the graph 600 illustrates a UE 100 performing the same communications and configured with the same C-DRX cycle as the UE 100 represented in the graph 200. However, in the graph 600 the UE 100 is utilizing a SR power saving mode of operation instead of the SR legacy mode of operation utilized by the UE 100 in the graph 200. Thus, like the graph 200, the x-axis 610 represents time. Each interval (1-12) along the x-axis 610 represents a subframe in milliseconds (ms) and for illustrative purposes will be referred to as subframe 1, subframe 2, subframe 3, etc. The graph 600 will be described in reference to the UE 100, the graph 200 and the method 500.

The graph 600 includes three line graphs 620, 630 and 640 representing the operations of the UE 100. Line graph 620 represents the same portion of the C-DRX cycle illustrated by the line graph 220 in graph 200. Thus, the line graph 620 illustrates that the onDuration begins at subframe 8 and ends with subframe 11.

Line graph 630 relates to uplink transmissions performed by the UE 100. The transmission illustrated by the line graph 630 are the same transmissions illustrated by the line graph 230 in the graph 200. Thus, line graph 630 illustrates that the UE 100 is in an active mode of processing a transmission during subframe 2 when the UE 100 is transmitting a SR and during subframe 10 when the UE 100 is transmitting data over an uplink channel.

Line graph 640 relates to the UE 100 performing operations that enable the UE to receive data from the network in accordance with the SR power saving mode. The level of the line graph 640 on the y-axis 615 illustrates when the UE 100 is in an active mode of processing for the reception of transmissions from the network. For example, when the line graph 640 is plotted along the x-axis 610 at point 642 of the y-axis 615 the UE 100 is not in an active mode of processing for the reception of transmissions from the network. When the line graph 640 is plotted along the x-axis 610 at point 644 of the y-axis 615 the UE 100 is in an active mode of processing for the reception of data transmitted by the network (e.g., tuning the transceiver 125 to listen for transmissions).

Consider that during execution of the self-learning mode, the UE 100 determined that the value of x is 4 subframes. Thus, after the transmission of the SR during subframe 2, control channel information is likely be received during (or after) subframe 6. Therefore, in the SR power saving mode, the UE 100 is not turned to active mode until subframe 6 (e.g., subframe 2+4(x)). Further, consider that like in the example provided in graph 200, control channel information is actually received during subframe 6. Thus, the line graph 640 illustrates that based on the SR power saving mode of operation, the UE 100 enters an active mode of processing during subframe 6 based on determining when the UE 100 is likely to receive control channel information from the network and remains in an active mode of processing during subframes 8-11 based on the onDuration of the C-DRX cycle 620.

A comparison of the line graph 640 in the graph 600 and the line graph 240 in the graph 200 demonstrates an example of power saving using the SR power saving mode. For instance, line graph 240 illustrates that the UE 100 is in an active mode of processing for data transmitted to the UE during subframes 3-7 to detect a grant that may be received outside of the onDuration in response to the SR transmitted in subframe 2. Thus, in the legacy mode of operation the UE 100 is in an active mode of processing for data transmitted to the UE and consuming power during subframes 3-7 outside of the onDuration. In contrast, line graph 640 demonstrates that UE 100 does not enter an active mode of processing for data transmitted to the UE 100 until subframe 6. Thus, saving power by eliminating instances, during the legacy mode of operation, where the UE 100 is in an active mode.

During execution of the power saving mode, the exemplary embodiments may monitor the downlink and the uplink to ensure that the UE 100 is utilizing data to determine when the UE 100 is likely to receive control channel information from the network that accurately reflects the scheduling behavior of the connection between the UE 100 and the network. For instance, data that was generated during self-learning may no longer reflect the characteristics of the scheduling behavior of the connection between the UE 100 and the network. This may be the result of a variety of factors such as, but not limited to, network conditions, interference, movement of the UE 100, scheduling patterns, etc. Thus, the power saving mode may be configured to monitor the connection between the UE 100 and the network to determine whether the parameter used to determine whether the UE 100 is likely to receive control channel information may be updated. As will be demonstrated below, the UE 100 may monitor both the uplink and the downlink between the UE 100 and the network.

Figure 7:
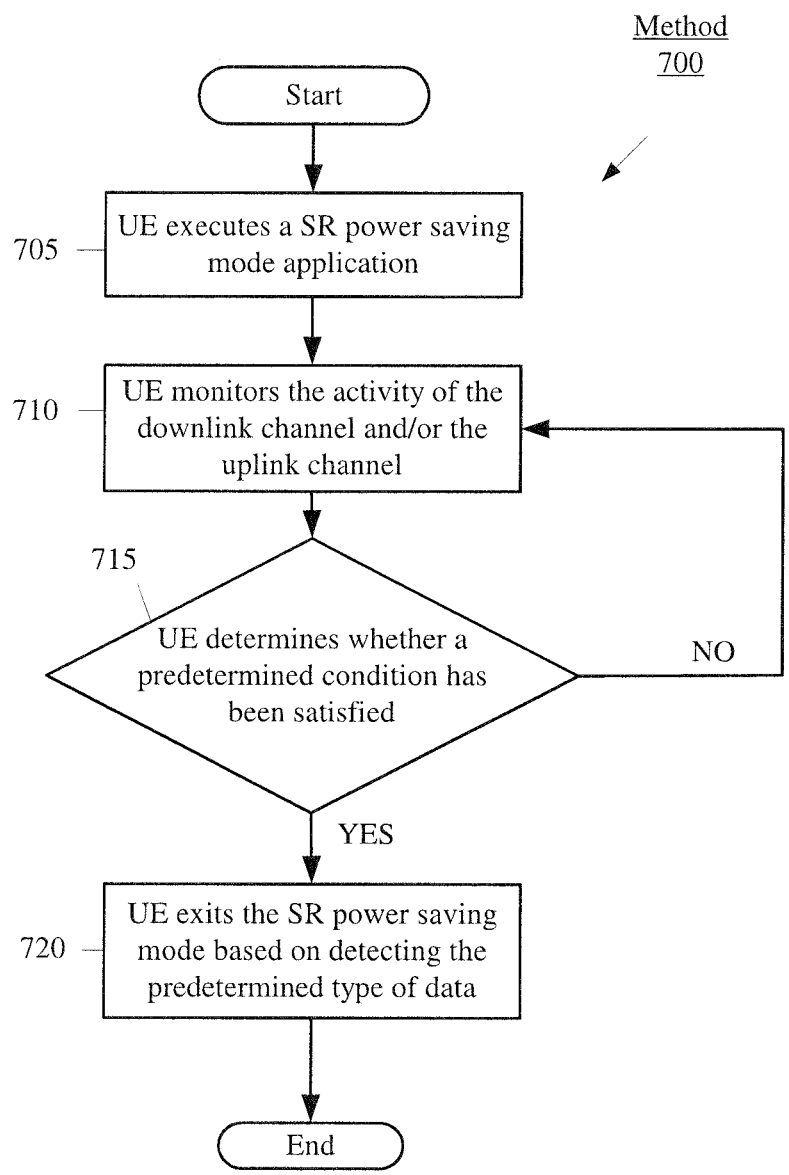
FIG. 7 shows a method for the monitoring mode of operation according to various exemplary embodiments.

FIG. 7 shows a method 700 for the monitoring mode of operation according to various exemplary embodiments. The method 700 relates to the monitoring mode of operation in 315 of the method 300. The monitoring mode of operation may include determining whether the UE 100 may remain in the SR power saving mode of operation. The method 700 will described with reference to the UE 100, the method 300, the method 400 and the method 500.

In 705, consider that the UE 100 is executing the power saving mode in accordance with the method 500. The execution of the SR power saving mode may trigger the execution of the monitoring mode of operation. However, the exemplary embodiments may initiate the monitoring mode of operation in any manner.

In 710, the UE 100 monitors the activity of the downlink channel and the uplink channel. Initially, the monitoring of the downlink channel is described. As data is received over the downlink channel, the UE 100 may monitor a plurality of characteristics related to the downlink channel, derive a plurality of parameters related to the downlink channel or any combination thereof. For example, the UE 100 may monitor the sr2DLGrant time, the sr2ULGrant time, etc. Further, the UE 100 may detect the type of data transmitted over the downlink channel. Types of data may include, but are not limited to, an initial transmission, a re-transmission, control channel information, an uplink grant, a downlink grant, etc. Thus, the monitoring of the downlink channel may refer to monitoring both the data channel and the control channel.

In addition, as data is transmitted over the uplink channel, the UE 100 may monitor a plurality of characteristics related to the uplink channel, derive a plurality of parameters related to the uplink channel or any combination thereof. For instance, the UE 100 may monitor the uplink block error rate (BLER), the channel condition, etc.

In 715, the UE 100 may determine whether a predetermined condition has been satisfied. The predetermined condition may correspond to the downlink channel, the uplink channel or a combination thereof. For instance, a predetermined condition may include, but is not limited to, a type of data transmitted over the downlink channel, a predetermined threshold, the quality of a channel, etc.

Initially, consider that the predetermined condition may be based on a type of data transmitted over the downlink channel. For instance, the predetermined condition may be whether a retransmission was received without receiving a corresponding initial downlink grant. A retransmission may indicate to the UE 100 that the SR power saving mode of operation may be utilizing a parameter that does not accurately reflect the scheduling behavior of the connection between the UE 100 and the network. For instance, consider that in response to a SR transmitted during subframe N the SR power saving mode is configured to enter an active mode of processing for the transmission of data during subframe N+4. If the initial transmission of the downlink grant was during a subframe preceding subframe N+4, the UE 100 may not receive the grant because the UE 100 was not in an active mode of processing for the reception of control channel information from the network. Thus, if a downlink data retransmission of the grant is received during, the UE 100 may determine that the UE 100 did not receive the downlink grant due to the configuration of the SR power saving mode of operation. Based on this indication, the UE 100 may exit the SR power saving mode and perform self-learning to determine the scheduling behavior of the connection between the UE 100 and the network. If the UE 100 does not detect the predetermined type of data over the downlink channel the method 700 returns to 710 where the UE 100 continues to monitor the downlink channel during the SR power saving mode of operation. If UE 100 detects the predetermined type of data, the predetermined condition may be satisfied and the method 700 continues to 720.

In a second example, consider that the predetermined condition may be based on a predetermined threshold related to the downlink channel. For instance, the predetermined condition may be whether the duration between the transmission of a SR and the reception of an uplink grant (sr2ULGrant) satisfies a predetermined threshold. This may indicate to the UE 100 that the SR power saving mode of operation may be utilizing a parameter that does not accurately reflect the scheduling behavior of the connection between the UE 100 and the network. Consider that after the transmission of a SR the UE 100 does not detect an uplink grant for a predetermined number of subframes (M). The lack of uplink grant for M may indicate to the UE 100 that the UE 100 missed the transmission of the uplink grant because the UE 100 was not in an active mode of processing for the reception of control channel information when the uplink grant was transmitted. Thus, if sr2ULGrant is greater than M or an uplink grant was never received, the predetermined threshold may be satisfied. Satisfying the predetermined condition may include determining whether the predetermined threshold has been satisfied for a single SR or for a plurality of SRs.

In a third example, consider that the predetermined condition may be based on a predetermined threshold related to the uplink channel. For instance, consider that the predetermined threshold is related to the uplink BLER. The UE 100 may monitor the uplink BLER to ensure that the uplink channel is reliably delivering transmissions (e.g. SR) to the network. If the BLER is below a certain threshold, (e.g., 1%, 10%, 20%, 25%, 30%, etc.) this may indicate to the UE 100 that the network may not receive a SR. Thus, the UE 100 may want to exit SR power saving mode and act in accordance with SR legacy mode to maximize the amount of time the UE 100 is actively processing for the reception of data from the network to detect any negative acknowledgments or any other indication related to a SR not being received by the network.

It should be noted that the predetermined condition may be based on a single instance of a predetermined threshold being satisfied or may be based on a plurality of predetermined thresholds being satisfied. Further, it should be noted that the examples provided above are merely for illustrative purposes. The UE 100 may determine that a predetermined condition is satisfied based on any indication that the SR power saving mode of operation is not accurately reflecting the scheduling behavior of the connection between the UE 100 and the network. Based on the predetermined threshold, the UE 100 may exit the SR power saving mode and perform self-learning to determine the scheduling behavior of the connection between the UE 100 and the network.

In 720, the UE 100 exits the SR power saving mode based on determining that the predetermined condition was satisfied. Subsequently, the UE 100 may initiate its self-learning mode of operation and make a new prediction that may serve as the basis for determining when the UE 100 is likely to receive control channel information during the SR power saving mode of operation. Alternatively, the UE 100 may update the data that serves as the basis for the SR power saving mode by receiving update data from the network, deriving update data based on stored data or a combination thereof.

In certain embodiments, the UE 100 may be configured with physical downlink control channel (PDCCH) only microsleep processing. This mode of processing may include the UE 100 performing operations that enable the UE 100 to receive control channel information transmitted to the UE 100 over the PDCCH. For example, the UE 100 may receive downlink control information (DCI) over the PDCCH. According to PDCCH only microsleep processing, upon the reception of the DCI, the UE 100 may turn off its active mode of processing for control channel information over the PDCCH and decode the DCI offline. Thus, PDCCH only microsleep processing may place the UE 100 in an active mode of processing for control channel information from the network (e.g., tune the transceiver 125 to listen for transmission) for only a portion of a subframe. PDCCH only microsleep processing consumes less power than an active mode of processing where the UE 100 performs operations that enable the reception of data during an entire subframe.

The exemplary embodiments may provide a UE 100 that may implement a SR power saving mode of operation with PDCCH only microsleep processing. It should be noted that reference to PDCCH only microsleep processing is merely exemplary, different networks may refer to similar functionality in a different way.

Figure 8:
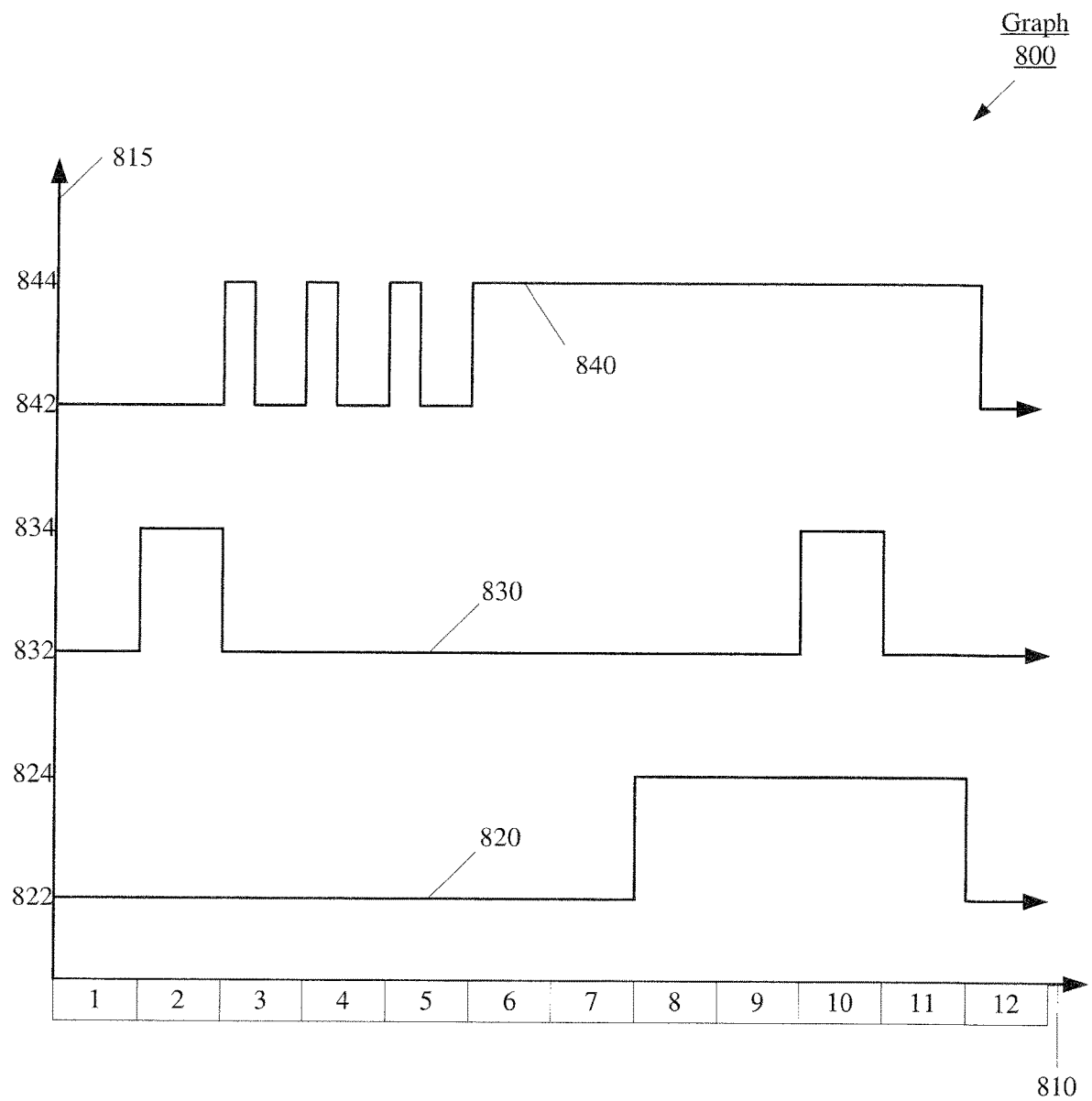
FIG. 8 shows a graph that provides an example of when an active mode of processing occurs during the SR power saving mode of operation with PDCCH only microsleep processing according to various exemplary embodiments.

FIG. 8 shows a graph that provides an example of when an active mode of processing occurs during the SR power saving mode of operation with PDCCH only microsleep processing according to various exemplary embodiments. The graph 800 illustrates when the UE 100 may be in an active mode of processing during a SR power saving mode of operation with PDCCH only microsleep processing. Further, the graph 800 illustrates a UE 100 performing the same communications and configured with the same C-DRX cycle as the UE 100 represented in the graph 200 and the UE 100 represented in the graph 600. Thus, the x-axis 810 represents time. Each interval (1-12) along the x-axis 810 represents a subframe in milliseconds (ms) and for illustrative purposes will be referred to as subframe 1, subframe 2, subframe 3, etc. A person of ordinary skill in the art will understand that subframes 1-12 may occur at any time. The graph 800 will be described in reference to the UE 100, the graph 200 and the graph 600.

The graph 800 includes three line graphs 820, 830 and 840 representing operations of the UE 100. Line graph 820 represents the same portion of the C-DRX cycle illustrated by the line graph 220 in graph 200 and line graph 620 in graph 600. Thus, the line graph 820 illustrates that the onDuration begins at subframe 8 and ends with subframe 11.

Line graph 830 relates to uplink transmissions performed by the UE 100. The transmission illustrated by the line graph 830 are the same transmissions illustrated by the line graph 230 in the graph 200 and the line graph 630 in the graph 600. Thus, the line graph 630 illustrates that the UE 100 is in an active mode of processing a transmission during subframe 2 when the UE 100 is transmitting a SR and during subframe 10 when the UE 100 is transmitting data over an uplink channel.

Line graph 840 relates to the UE 100 performing operations that enable the UE 100 to receive data from the network in accordance with an SR power saving mode with PDCCH only microsleep processing. The level of the line graph 840 on the y-axis 815 illustrates when the UE 100 is in an active mode of processing for the reception of transmissions from the network (e.g., the transceiver 125 is tuned to listen for transmissions). For example, when the line graph 840 is plotted along the x-axis 810 at point 842 of the y-axis 815 the UE 100 is not in an active mode of processing for the reception of transmissions from the network. When line graph 840 is plotted along the x-axis 810 at point 844 of the y-axis 815 the UE is in an active mode of processing for the reception of data transmitted by the network.

Consider that during execution of the SR power saving mode with PDCCH only microsleep processing, the UE 100 determined that after the transmission of the SR during subframe 2, data may be received outside of the onDuration during or after subframe 6. Further, consider that like in the examples provided in graph 200 and graph 600, data is actually received during subframe 6. Thus, line graph 840 illustrates that based on the SR power saving mode with PDCCH only microsleep processing, the UE 100 utilizes PDCCH only microsleep processing during subframes 3-5. As mentioned above, PDCCH only microsleep processing includes the UE 100 detecting that DCI has been received and decoding the DCI offline. Thus, PDCCH only microsleep processing places the UE 100 in an active mode of processing for the reception of a transmission during only a portion of a subframe. Thus, the line graph 840 illustrates that the UE 100 is only in an active mode of processing during a portion of subframe 3, a portion of subframe 4 and a portion of subframe 5 based on the PDCCH only microsleep processing. Further, the line graph 840 illustrates that the UE 100 is in an active mode of processing for the entirety of subframe 6 and subframe 7 based on determining that the UE 100 is likely to receive control channel information from the network during these subframes. Further, the line graph 840 illustrates that the UE 100 remains in an active mode of processing during subframes 8-11 based on the onDuration of the C-DRX cycle.

A comparison of the line graph 840 in the graph 800 and the line graph 240 in the graph 200 may demonstrate the power saving of the SR power saving mode with PDCCH only microsleep processing. For instance, line graph 240 illustrates that the UE 100 is in an active mode of processing for data transmitted to the UE during subframes 3-7 to detect a grant that may be received outside of the onDuration in response to the SR transmitted in subframe 2. Thus, in the legacy mode of operation the UE 100 is in an active mode of processing for data transmitted to the UE and consuming power during subframes 3-7 outside of the onDuration. In contrast, line graph 840 demonstrates that while the UE 100 may be in an active mode of processing during subframes 3-5 the UE 100 is only in an active mode for a portion of subframe 3, a portion of subframe 4 and a portion of subframe 5. Thus, saving power by eliminating the amount of time the UE 100 is in an active mode or processing during various subframes outside of an onDuration of the C-DRX cycle.

It should be noted that the SR power saving mode of operation with PDCCH only microsleep processing may provide data that other processing modes may not be able to obtain. For instance, a sr2DLGrant and a sr2ULGrant may be determined more accurately based on the reception and decoding of the DCI during PDCCH only microsleep processing because the DCI may provide an accurate indication as to when a grant may be transmitted to the UE 100 by the network. Thus, the SR power saving mode of operation with PDCCH only microsleep processing may rely on information indicated in the DCI to adapt to the eNB scheduling behavior instead of relying on information generated by self-learning prior to the execution of the SR power saving mode of operation. Thus, the SR power saving mode of operation with PDCCH only microsleep processing may be able to adapt to eNB scheduling behavior faster than a SR power saving mode that does not utilize PDCCH only microsleep processing.

Figure 9:
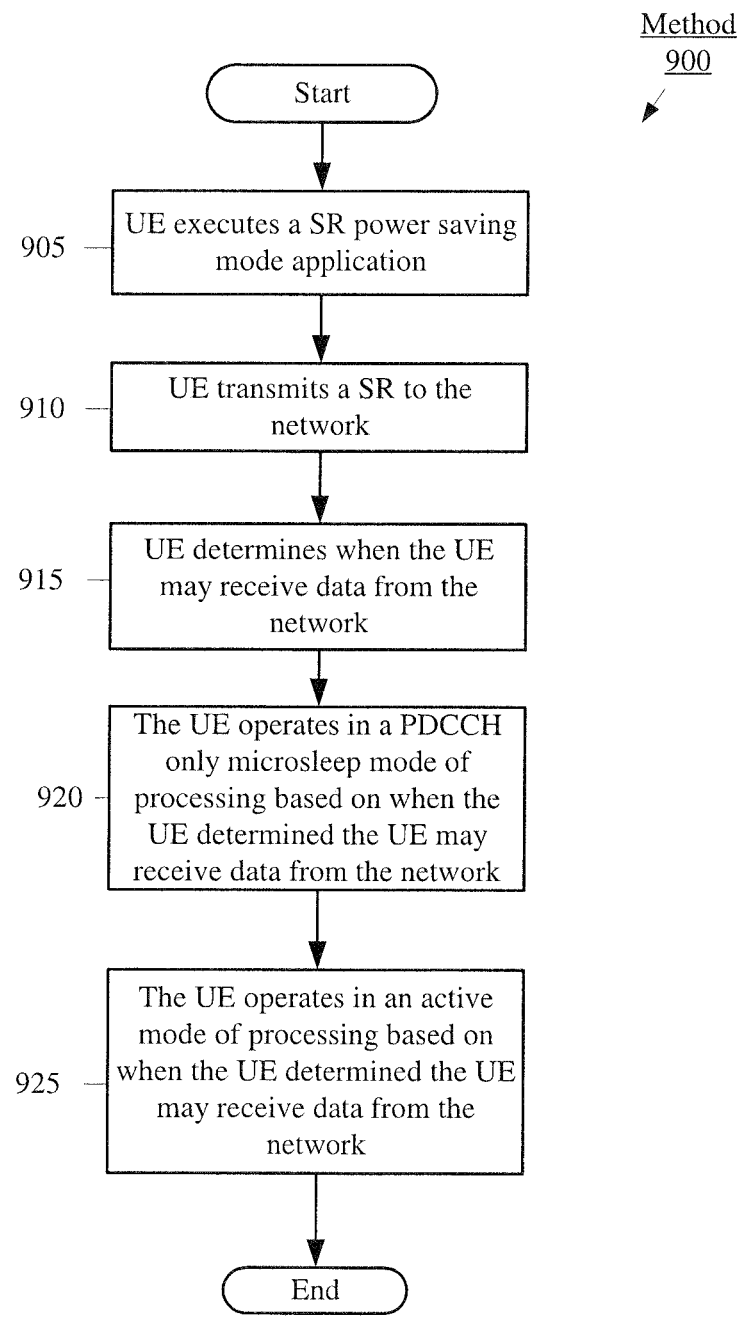
FIG. 9 shows a method for the SR power saving mode of operation with PDCCH only microsleep processing according to various exemplary embodiments.

FIG. 9 shows a method for the SR power saving mode of operation with PDCCH only microsleep processing according to various exemplary embodiments. As mentioned above, the SR power saving mode of operation may relate to when the UE 100 transmits a SR outside of an onDuration of a C-DRX cycle. For example, the UE may enter the SR power saving mode of operation and based on when the UE 100 has determined it is likely to receive control channel information after the transmission of a SR, the UE 100 may limit its active mode of processing time. This may include the UE 100 utilizing the PDCCH only microsleep processing. Thus, eliminating instances where the UE 100 is using power to perform operations that enable the reception of data and no control channel information is received. The method 800 will be described with reference to the UE 100, method 300 and the method 400.

In 905 the UE 100 executes the SR power saving mode application 140. It may be considered that the UE 100 may be currently be connected to an eNB, configured with a C-DRX cycle and configured with PDCCH only microsleep processing. The execution of the SR power saving mode application 140 may be triggered by a conditional event.

In 910, the UE 100 transmits a SR to the network. As mentioned above, the UE 100 may transmit a SR to the network when the UE 100 has data corresponding to an application that is to be scheduled for transmission on an uplink channel.

In 915, the UE 100 determines when the UE is likely to receive control channel information from the network (e.g. an uplink grant, a downlink grant, etc.). Similar to the method 400, this determination may be based on self-learning. However, this determination may also be based on parameters related to characteristics of the connection between the UE 100 and the network. For instance, when the connection between the UE 100 and the network is utilizing FDD, the UE 100 may forgo self-learning because typically during FDD if a SR is transmitted at subframe N, then an uplink grant may be received at subframe N+4 and thus, the UE 100 may utilize this information to determine when the UE 100 is likely to receive control channel information from the network. Alternatively, when the connection between the UE 100 and the network is utilizing TDD, the UE 100 may forgo self-learning because according the $3^{rd}$ Generation Partnership Project (3GPP) Technical Specification (TS) 36.213 uplink grant occasions have to follow the parameter $K_{PUSCH}$ as defined in table 5.1.1.1-1 and thus, the UE 100 may utilize this information to determine when the UE 100 is likely to receive control channel information from the network. Further, this determination may also be based on factors such as, but not limited to, when a downlink grant was detected for a previous SR, data related to a plurality of previous SR, data related to SR transmitted by other UEs, etc.

In 920, the UE 100 utilizes PDCCH only microsleep processing based on when the UE 100 determined that the UE 100 is likely to receive control channel information from the network. Since PDCCH only microsleep processing may include retransmissions, the UE 100 may implement PDCCH only microsleep processing during instances, between the transmission of a SR and when the UE 100 has determined that it is likely to receive control channel information (e.g. an uplink grant, a downlink grant, etc.) from the network. For instance, if the UE determines that after the transmission of a SR during subframe N, the UE 100 is likely to receive control channel information from the network during subframe N+4, the UE 100 may utilize PDCCH only microsleep processing during subframe N+1, N+2 and N+3. To provide another example, consider the UE 100 represented by the graph 800 where the UE 100 determines that control channel information may be received from the network during subframe or after 6 of the x-axis 810. Accordingly, the line graph 840 illustrates that UE 100 may utilize PDCCH only microsleep processing during subframes 3-5. Thus, the UE 100 may utilize PDCCH only microsleep processing during instances where the UE 100 has determined that it is unlikely to receive a grant from the network. However, this configuration is merely provided for exemplary purposes and the exemplary embodiments may utilize PDCCH only microsleep processing at any point between onDurations of a C-DRX cycle.

Returning to FIG. 9, in 925, the UE 100 may operate in an active mode of processing based on when the UE 100 determined that the UE 100 is likely to receive control channel information from the network. For instance, if the UE 100 determines that after the transmission of a SR during subframe N, the UE 100 is likely to receive control channel information from the network during subframe N+4, the UE 100 may enter an active mode of processing starting at subframe N+4 and until the next onDuration based on when the UE 100 determined that the UE 100 is likely to receive control channel information from the network. Subsequently, the UE 100 may operate in accordance with the scheduled C-DRX cycle. Thus, the SR power saving mode of operation with PDCCH only microsleep processing, results in power saving by the UE 100 over the SR legacy mode of operation because in the SR power saving mode of operation with PDCCH only microsleep processing the UE 100 is limiting its active mode of processing to only portions of subframes where the UE 100 determines that transmissions from the network are unlikely.

During execution of the SR power saving mode with PDCCH only microsleep processing, the exemplary embodiments may monitor the exchange of data between the UE 100 and the network to ensure that the UE 100 is utilizing parameters to determine when the UE 100 will receive control channel information from the network that accurately reflect the scheduling behavior of the connection between the UE 100 and the network. For instance, as a result of a variety of factors such as, but not limited to, a change in network conditions, network load, movement of the UE 100, scheduling patterns, interference, etc., the UE 100 is likely to receive control channel information from the network during a period of time that is not included within when the UE 100 determined the UE 100 is likely to receive control channel information from the network. Thus, the SR power saving mode with PDCCH only microsleep processing may be configured to monitor the exchange of data between the UE 100 to determine whether the parameter used to determine when the UE 100 is likely to receive control channel information from the network may be updated.

Figure 10:
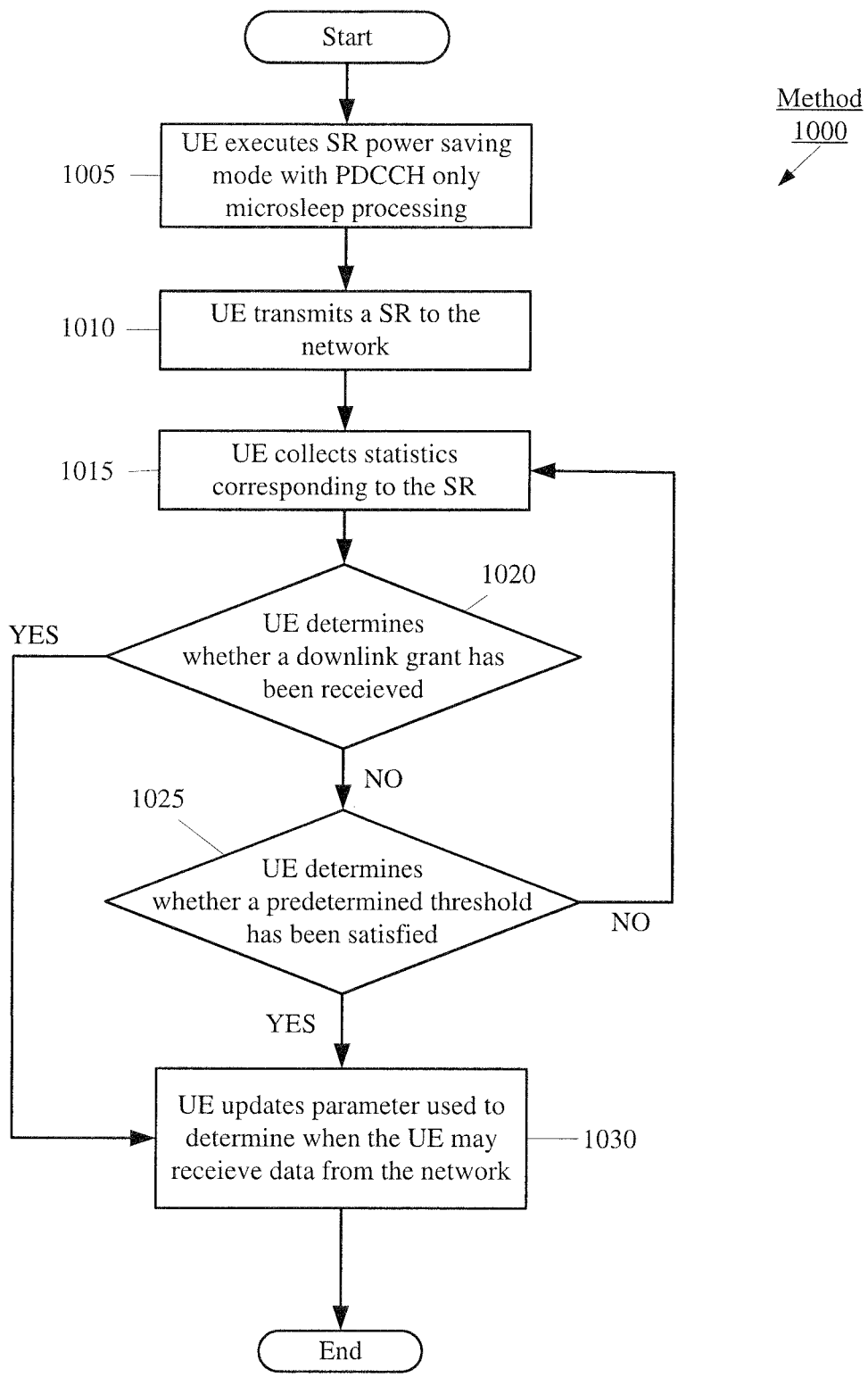
FIG. 10 shows a method for the monitoring mode of operation during the SR power saving mode of operation with PDCCH only microsleep processing according to various exemplary embodiments.

FIG. 10 shows a method for the monitoring mode of operation during the SR power saving mode of operation with PDCCH only microsleep processing according to various exemplary embodiments. The method 1000 relates to monitoring the exchange of data between the UE 100 and the network during the operation of the SR power saving mode with PDCCH only microsleep processing to determine whether the parameter used to determine when the UE 100 is likely to receive control channel information from the network may be updated. The method 1000 will described with reference to the UE 100 and the method 900.

In 1005, the UE 100 is executing the SR power saving mode with PDCCH only microsleep processing in accordance with the method 900. The execution of the SR power saving mode with PDCCH only microsleep processing may trigger the execution of the monitoring functionality. However, the exemplary embodiments may initiate the monitoring functionality of the SR power saving mode with PSCCH only microsleep mode processing in any manner.

In 1010, the UE 100 transmits a SR to the network. For example, the UE 100 may transmit a SR to the network when the UE 100 determines that the UE 100 may schedule data to be received over the downlink. However, the SR corresponding to scheduling the reception of data over the downlink is only exemplary. The exemplary embodiments may apply to the transmission of a SR corresponding to scheduling an uplink transmission.

In 1015, the UE 100 collects statistics corresponding to the SR. The collection of statistics in 1015 may be similar to the collection of statistics described in regard to the method 300. The statistics may include, but are not limited to, an indication as to the amount of time from the transmission of the SR to the reception of a downlink grant (sr2DLGrant) and an indication as to the amount of time from the transmission of the SR to the reception of an uplink grant (sr2ULGrant). Alternatively, the UE 100 is likely to receive an indication that a type of grant (e.g. downlink grant, uplink grant) was received. The statistics may be collected based on a timer, by determining a number of subframes between a SR and a grant, or by any other suitable manner. It should be noted that sr2DLGrant and sr2ULGrant are merely provided for exemplary purposes and the UE 100 may collect any statistic related to determining whether the parameter used to determine when the UE 100 is likely to receive control channel information from the network may be updated.

Further, it should be noted that the UE 100 may collect statistics corresponding to the SR transmitted in 1010 based on whether the transmission of the SR was preceded by a period of sleep for the UE 100. For instance, in a conventional network arrangement, depending on various factors, if the UE 100 is in a sleep mode before the transmission of a SR, the network may transmit a grant in response to the SR outside of an onDuration. The UE 100 may utilize this conventional network arrangement trait to trigger the collection of the statistics corresponding to the SR.

It should also be noted that the collection of statistics may relate to whether control channel information was received while the UE 100 was utilizing PDCCH only microsleep processing. For instance, consider the line graph 840 of the graph 800. The statistics may include an indication as to whether a grant was received during subframes 3-5 where the UE 100 is utilizing PDCCH only microsleep processing.

In 1020, the UE 100 determines whether a downlink grant has been received when the UE 100 is utilizing PDCCH only microsleep processing. For instance, when utilizing PDCCH only microsleep processing, the UE 100 may perform operations that enable the UE 100 to receive data from the network. The data may include DCI and upon reception of DCI, the UE 100 may enter a sleep mode and decode the DCI offline. Thus, when the UE 100 is utilizing PDCCH only microsleep processing for a subframe the UE 100 is in an active mode of processing for only a portion of the subframe. Thus, the UE 100 may determine whether a downlink grant has been received when the UE 100 is utilizing PDCCH only microsleep processing based on the control channel information received during the portion of the subframe where the UE 100 is in an active mode of processing for control channel information from the network. If the UE 100 determines a downlink grant has been received while utilizing PDCCH only microsleep processing this may indicate to the UE 100 that the parameter used to determine when the UE 100 is likely to receive control channel information from the network does not accurately reflect the eNB scheduling behavior of the connection between the UE 100 and the network. Thus, the method 1000 continues to 1030 where the parameter is updated. Exemplary manners of updating the parameter in 1030 is described in greater detail below. However, if the UE 100 determines a downlink grant has not been received, the method 1000 continues the 1025. It should be noted that 1020 may include determining whether an uplink grant has been received during the PDCCH only microsleep processing mode of operation. Subsequently, the UE 100 may update the parameter based on only the detection of a downlink grant, only the detection of an uplink grant or a combination thereof.

In 1025 the UE 100 determines whether a predetermined threshold has been satisfied. Specifically, the UE 100 utilizes a predetermined threshold to determine whether the parameter used to determine when the UE 100 is likely to receive control channel information from the network accurately reflects the eNB scheduling behavior of the connection between the UE 100 and the network.

In a first example, the UE 100 may utilize a predetermined threshold that corresponds to whether the amount of time the UE 100 is utilizing PDCCH only microsleep processing may be decreased. For instance, consider the example provided in the graph 800. The UE 100 is configured to operate with PDCCH only microsleep processing during subframes 3-5. The predetermined threshold may indicate that the UE 100 is receiving control channel information during subframe 4. Thus, the predetermined threshold may indicate that the UE 100 may decrease the amount of time the UE 100 is utilizing PDCCH only microsleep processing to subframe 3 and enter an active mode of processing the entire subframe starting with subframe 4 where the control channel information is likely to be received. Thus, the UE 100 may adapt to the scheduling behavior of the connection between the UE 100 and the network. Specifically, the threshold may relate to the reception of an uplink grant, a downlink grant, or a combination thereof when the UE 100 is utilizing PDCCH only microsleep processing. It should be noted that this threshold may indicate to the UE 100 that the scheduling behavior of the connection between the UE 100 and the network is resulting in a grant being received when the UE 100 is utilizing PDCCH only microsleep processing. Thus, the UE 100 may use this threshold to determine that the parameter used to determine when the UE 100 is likely to receive control channel information may need to be updated to adapt to the current eNB scheduling behavior that is resulting in control channel information being received when the UE 100 is utilizing PDCCH only microsleep processing. This threshold may be based on statistics that were stored in the memory of the UE 100 after the transmission of prior SR.

Consider a predetermined threshold related to a number of times the UE 100 may receive control channel information while the UE 100 is utilizing PDCCH only microsleep processing. For example, consider a threshold of two. It should be noted that a threshold of any number may be used (e.g. 1, 5 10, 15, 20, 25, 50, etc.). The UE 100 may detect an uplink grant when the UE 100 is utilizing PDCCH only microsleep processing after the transmission of a first SR, save the statistics corresponding to the first SR and mark a counter or flag bit to indicate a number (e.g. one) of statistics stored in the memory. Since the counter does not satisfy the threshold of two the UE 100 returns to 1015 to collect statistics for a subsequent SR. After the transmission of a second SR, the UE 100 may detect an uplink grant when the UE 100 is utilizing PDCCH only MicorSleep processing, save the statistics corresponding to the second SR and mark a counter or flag bit to indicate the number (e.g. 2) of statistics stored in the memory. Since the counter is greater than or equal to the threshold the method 1000 may continue to 1030 where the parameter is updated.

In a second example, the UE 100 may utilize a predetermined threshold that corresponds to whether the amount of PDCCH only microsleep processing time may be increased. For instance, consider the example provided in the graph 800. The UE 100 is configured to operate with PDCCH only microsleep processing during subframes 3-5. The predetermined threshold may indicate that the UE 100 is receiving control channel information during subframe 7. Thus, the predetermined threshold may indicate that the UE 100 may increase the amount of time the UE 100 is utilizing PDCCH only microsleep processing to subframes 3-7 and enter an active mode of processing starting with the onDuration. Thus, the UE 100 may adapt to the scheduling behavior of the connection between the UE 100 and the network. Specifically, the threshold may relate to sr2ULGrant, the Sr2DLGrant, or any combination thereof. It should be noted that this threshold may indicate to the UE 100 that the scheduling behavior of the connection between the UE 100 and the network is resulting in the UE 100 performing active processing to enable to the reception of data from the network during periods of time the UE 100 is likely not receiving any control channel information. Thus, the UE 100 may use this threshold to determine that the parameter used to determine when the UE 100 is likely to receive control channel information may need to be updated to adapt to the current eNB scheduling behavior that is resulting in performing active processing to enable to the reception of data from the network during periods of time the UE 100 is not receiving any data. This threshold may be based on statistics that were stored in the memory of the UE 100 after the transmission of prior SR.

Consider a predetermined threshold related to a number of sets of statistics, each set corresponding to a transmitted SR. Consider a predetermined threshold of 20. However, a threshold of any number may be used (e.g. 1, 5 10, 15, 25, 50, etc.). In the second example, The UE 100 may save the statistics corresponding to the transmission of a first SR and mark a counter or flag bit to indicate a number (e.g. one) of statistics stored in the memory. Since the counter does not satisfy the predetermined threshold the method 1000 returns to 1015 where statistics are again collected. This process may repeat until the counter is equal to or greater than the predetermined threshold. Subsequently, the UE 100 may determine whether any of the sets of statistics provide an indication as to whether the parameter used to determine when the UE 100 is likely to receive control channel information may be updated. For instance, the UE 100 may determine whether a sr2ULGrant and/or an sr2DLGrant from the plurality of sets of statistics indicates that the UE 100 is performing active processing during instances where the UE 100 is not likely to receive any data. Thus, the UE 100 may determine that the scheduling behavior of the connection between the UE 100 and the network may allow the UE 100 to increase the amount of time the UE 100 is utilizing PDCHH only microsleep processing and thus, increase the amount of power saved. If the UE 100 does not detect such an indication the predetermined threshold is not satisfied and the method 1000 may return to 1015 where statistics are again collect. At any point during the method 1000 the predetermined threshold may be reset, the counter may be reset, a predetermined threshold type may be changes, a predetermined threshold value may be changed etc. If the UE 100 detects an indication that the predetermined threshold is satisfied the method 1000 continues to 1030 where the parameter is also updated. It should be noted that the first and second samples related to the predetermined thresholds are merely provided for illustrative purposes. The exemplary embodiments may relate to a threshold based on any suitable information.

In 1030, the parameter used to determine when the UE 100 is likely to receive control channel information from the network is updated. As mentioned above, this update may be based on a determination that a grant was received when the UE 100 is utilizing PDCCH only microsleep processing. Thus, the UE 100 may update the parameter used to determine when the UE 100 is likely to receive control channel information based on when the grant was received in 1020. Alternatively, this update may be triggered in response to a determination that a predetermined threshold has been satisfied in 1025. Thus, the UE 100 may update the parameter used to determine when the UE 100 is likely to receive control channel information based on whether PDCCH only microsleep processing time may be decreased or the UE 100 may update the parameter used to determine when the UE 100 is likely to receive control channel information based on whether PDCCH only microsleep processing time may be increased. Thus, the method 1000 enables the UE 100 to adapt to the current scheduling behavior of the connection between the UE 100 and the network to optimize the amount of time PDCCH only microsleep processing that occurs during the SR power saving mode.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent

What is claimed:

1. A method, comprising:
at a user equipment (UE) associating with an evolved Node B (eNB) to establish connection to a Long Term Evolution (LTE) network, the UE and the LTE network configured with a Connected Discontinuous Reception (C-DRX) functionality, the C-DRX functionality including a cycle with at least one onDuration:
transmitting, during a first subframe a scheduling request (SR) to the LTE network, wherein the SR corresponds to data that is to be transmitted by the UE;
determining a second subframe for the UE to enter an active mode of processing for a reception of a grant, wherein the second subframe is subsequent to the first subframe and prior to a next onDuration; and
initiating the active mode of processing for the reception of the grant during the second subframe.

2. The method of claim 1, wherein determining the second subframe is based on a number of subframes between a transmission of a previous SR to the LTE network and reception of a previous grant subsequent to the previous SR.

3. The method of claim 1, wherein determining the second subframe is based on whether the connection is a frequency division duplexing (FDD) connection or a time division duplexing (TDD) connection.

4. The method of claim 1, wherein the grant comprises an uplink grant in response to the SR or a downlink grant.

5. The method of claim 1, further comprising:
(a) determining whether a downlink data retransmission has been received without receiving a corresponding downlink grant;
(b) determining whether an uplink grant corresponding to the SR has not been received within a predetermined number of subframes from the first subframe; and
(c) when (a) or (b) is determined to be true, for a subsequent SR, determining a further second subframe that is different from the second subframe.

6. The method of claim 1, further comprising:
monitoring a parameter related to an uplink channel between the UE and the LTE network;
determining that the parameter related to the uplink channel satisfies a predetermined condition; and
when the predetermined condition is satisfied, for a subsequent SR, determining a further second subframe that is different from the second subframe.

7. The method of claim 1, wherein during subframes between the first subframe and the second subframe, the UE is one of in a sleep mode or in an active mode for a portion of each of the subframes between the first and second subframe, and in the sleep mode for a remaining portion of each of the subframes between the first and second subframes, wherein the sleep mode comprises the UE turning off a receiver of the UE.

8. The method of claim 7, wherein when the UE is in the active mode for the portion of each of the subframes, the method further comprises:
determining whether the grant was received during the portion of one of the subframes; and
when the grant was received during the portion of one of the subframes, for a subsequent SR, detecting a further second subframe that corresponds to the one of the subframes.

9. The method of claim 1, further comprising:
performing the transmitting, determining and initiating operations for a plurality of SRs;
determining whether the grant corresponding to each of the SRs is received after the second subframe for a predetermined number of consecutive SRs; and
when the grants are received for the predetermined number of consecutive SRS, for a subsequent SR, detecting a further second subframe based on the reception of the grants.

10. A user equipment (UE) comprising:
a transceiver configured to establish connection with an evolved Node B (eNB) corresponding to a Long Term Evolution (LTE) network, the UE and the LTE network configured with a Connected Discontinuous Reception (C-DRX) functionality, the C-DRX functionality including a cycle with at least one onDuration;
a processor configured to instruct the transceiver to operate in a first mode wherein the transceiver is in an active mode for all the subframes between a first subframe when a scheduling request (SR) is transmitted by the transceiver and a second subframe corresponding to a start of the onDuration,
the processor further configured to instruct the transceiver to operate in a second mode when the transceiver is in a sleep mode for at least one subframe between the first subframe and the second subframe.

11. The UE of claim 10, wherein in the second mode, a number of subframes for which the transceiver is in sleep mode is based on a number of subframes between a transmission of a previous SR and reception of a grant subsequent to the previous SR when the transceiver is in the first mode.

12. The UE of claim 10, wherein in the second mode, the processor monitors one of an uplink channel or a downlink channel between the UE and the eNB for a predetermined condition and when the predetermined condition is detected, the processor instructs the transceiver to operate in the first mode.

13. The UE of claim 11, wherein the predetermined condition comprises one of an uplink block error rate (BLER) exceeding a predetermined condition threshold, a downlink retransmission being received without a corresponding downlink grant being received or an uplink grant corresponding to the SR not being received prior to a predetermine number of subframes after the first subframe.

14. The UE of claim 10, wherein the transceiver is in the sleep mode for only a portion of the at least one subframe.

15. An integrated circuit, comprising:
circuitry configured to establish a connection to a Long Term Evolution (LTE) network, the first circuitry and the LTE network configured with a Connected Discontinuous Reception (C-DRX) functionality, the C-DRX functionality including a cycle with at least one onDuration;
circuitry configured to generate for transmission, during a first subframe, a scheduling request (SR) to the LTE network, wherein the SR corresponds to data that is to be transmitted to the LTE network;

circuitry configured to determine a second subframe, during which an active mode of processing for a reception of a grant is initiated, wherein the second subframe is subsequent to the first subframe and prior to a next onDuration; and circuitry configured to initiate the active mode of processing for the reception of the grant during the second subframe.

16. The integrated circuit of claim 15, wherein determining the second subframe is based on the connection being a time division duplexing (TDD) connection.

17. The integrated circuit of claim 15, wherein determining the second subframe is based on the connection being a frequency division duplexing (FDD) connection.

18. The integrated circuit of claim 15, wherein the grant comprises an uplink grant in response to the SR or a downlink grant.

19. The integrated circuit of claim 15, wherein determining the second subframe is based on a number of subframes between a transmission of a previous SR to the LTE network and reception of a previous grant subsequent to the previous SR.

20. The integrated circuit of claim 15, wherein during subframes between the first subframe and the second subframe, the device is in an active mode for a portion of each of the subframes between the first and second subframe and in a sleep mode for a remaining portion of each of the subframes between the first and second subframes, wherein the sleep mode comprises the device turning off a receiver of the device.

* * * * *